US011939944B2

(12) United States Patent
Carugati et al.

(10) Patent No.: US 11,939,944 B2
(45) Date of Patent: Mar. 26, 2024

(54) ELECTRONIC DEVICE TO CONTROL AN IGNITION COIL OF AN INTERNAL COMBUSTION ENGINE AND ELECTRONIC IGNITION SYSTEM THEREOF FOR DETECTING A MISFIRE IN THE INTERNAL COMBUSTION ENGINE

(71) Applicant: ELDOR CORPORATION S.P.A., Orsenigo (IT)

(72) Inventors: Eugenio Carugati, Orsenigo (IT); Stefano Silva, Orsenigo (IT); Pasquale Forte, Orsenigo (IT)

(73) Assignee: ELDOR CORPORATION S.P.A., Orsenigo (IT)

( * ) Notice: Subject to any disclaimer, the term of this patent is extended or adjusted under 35 U.S.C. 154(b) by 0 days.

(21) Appl. No.: 17/429,204

(22) PCT Filed: Feb. 19, 2020

(86) PCT No.: PCT/IB2020/051374
§ 371 (c)(1),
(2) Date: Aug. 6, 2021

(87) PCT Pub. No.: WO2020/170149
PCT Pub. Date: Aug. 27, 2020

(65) Prior Publication Data

US 2022/0120251 A1 Apr. 21, 2022

(30) Foreign Application Priority Data

Feb. 21, 2019 (IT) ........................ 102019000002513

(51) Int. Cl.
*F02P 3/04* (2006.01)
*F02P 17/12* (2006.01)

(52) U.S. Cl.
CPC ............. *F02P 3/0442* (2013.01); *F02P 17/12* (2013.01); *F02P 2017/125* (2013.01)

(58) Field of Classification Search
CPC ............... F02P 3/0442; F02P 2017/125; F02P 2017/128; F02D 2200/1015
(Continued)

(56) References Cited

U.S. PATENT DOCUMENTS 5,178,001 A * 1/1993 Ikeuchi ................... F02P 17/12 123/406.27
5,241,937 A * 9/1993 Kanehiro ................ F02P 17/12 123/406.27
(Continued)

FOREIGN PATENT DOCUMENTS

JP 61258968 A * 11/1986
JP 11093820 A * 4/1999
(Continued)

OTHER PUBLICATIONS

International Search Report and Written Opinion, dated Jun. 8, 2020, from PCT/IB2020/051374 filed Feb. 19, 2020.
(Continued)

*Primary Examiner* — John M Zaleskas
*Assistant Examiner* — Joshua Campbell
(74) *Attorney, Agent, or Firm* — Workman Nydegger

(57) ABSTRACT

It is disclosed an electronic device to control an ignition coil of an internal combustion engine, comprising a high-voltage switch, a driving unit, a bias circuit and an integrating circuit. The high-voltage switch is connected in series with a primary winding of a coil. The driving unit is configured to control the closing and opening of the high-voltage switch. The integrating circuit is interposed between the bias circuit and a reference voltage. The integrating circuit comprises an integrating capacitor connected in series to the bias
(Continued)

circuit and connected between the bias circuit and the reference voltage. The integrating capacitor is configured to maintain a substantially null charge during a phase of measurement of a ionization current as to measure a substantially null value of an integral of the ionization current, in the case of a misfire of the comburent-combustible mixture.

11 Claims, 11 Drawing Sheets

(58) Field of Classification Search
USPC .......................................................... 123/618
See application file for complete search history.

(56) References Cited

U.S. PATENT DOCUMENTS 5,534,781 A * 7/1996 Lee ....................... G01L 23/221 324/459
6,032,617 A * 3/2000 Willi ................... F02D 19/0692 123/304
7,559,319 B2 * 7/2009 Idogawa ............... F02P 3/0442 123/655
9,429,132 B1 * 8/2016 Lepley .................. F02P 3/0435
2007/0186903 A1 * 8/2007 Zhu ....................... F02P 5/1523 123/406.28
2015/0019112 A1 1/2015 Shiraishi

FOREIGN PATENT DOCUMENTS

JP 2007332895 A * 12/2007
JP 2007332895 A 12/2007
WO WO-2016181242 A1 * 11/2016 ........... F02D 35/021

OTHER PUBLICATIONS

Chinese Office Action, English translation, dated Nov. 8, 2022, from Chinese App. No. 202080029817.5.

* cited by examiner

ELECTRONIC DEVICE TO CONTROL AN IGNITION COIL OF AN INTERNAL COMBUSTION ENGINE AND ELECTRONIC IGNITION SYSTEM THEREOF FOR DETECTING A MISFIRE IN THE INTERNAL COMBUSTION ENGINE

BACKGROUND

Technical Field

The present disclosure generally relates to the field of electronic ignition of an internal combustion engine, such as for example an engine of a motor vehicle.

More in particular, the present disclosure concerns an electronic device to control an ignition coil of an internal combustion engine and electronic ignition system thereof which is capable of detecting a misfire of a comburent-combustible mixture (for example, oxygen in the air as the comburent and fuel as the combustible) in a cylinder of the engine, by means of the measurement of the ionization current generated in the cylinder in question.

Description of the Related Art

Modern internal combustion engines for motor vehicles are equipped with systems for monitoring the internal combustion process with the aim of maximizing the efficiency and the performance of the engine.

Measuring the ionization current is known, so as to obtain data indicative of parameters of the combustion process of the air-fuel mixture directly from the combustion chamber.

In particular, the spark plug is used as a sensor of ions (typically of the type $CHO^+$, $H_3O^+$, $C_3H_3^+$, $NO_2^+$) which are generated in the combustion chamber after the spark between the electrodes of the spark plug has been generated and the combustion of the air-fuel mixture has taken place.

The ionization current is thus generated by applying a potential difference to the electrodes of the spark plug and by measuring the current generated by means of the ions produced in the combustion chamber.

By means of the measurement of the ionization current it is possible to detect in real time a misfire of the air-fuel mixture (more in general, of a mixture of a comburent with a combustible) and then take timely actions to prevent failures of the engine.

U.S. Pat. No. 5,534,781 A1 discloses a system for detecting the ionization current which uses (see FIGS. 1 and 2) an integrating circuit 45 to calculate a voltage proportional to the integral of the ionization current.

The integrator 45 is based on an operational amplifier 46 and it comprises two diodes 40, 42 in parallel connected in opposite directions and a series connection of a resistor 44 and a capacitor 48.

The signal generated at the output of the integrator 45 is read by the Electronic Control Unit (ECU) 10.

The Applicant has observed that the integrating circuit 45 of U.S. Pat. No. 5,534,781 A1 is too complex, since it requires the use of an operational amplifier 46 and a number of other electronic components.

Furthermore, U.S. Pat. No. 5,534,781 does not mention the manner in which the information regarding the detection of a misfire is transmitted from the coil 25 to the Electronic Control Unit 10.

BRIEF SUMMARY

The present disclosure relates to an electronic device to control an ignition coil of an internal combustion engine and electronic ignition system thereof for detecting a misfire in the internal combustion engine as defined in the enclosed claims 1 and 5 and by their preferred embodiments disclosed in dependent claims from 2 to 4 and from 6 to 11, respectively.

The Applicant has perceived that the electronic control device and the electronic ignition system according to the present disclosure allow the detection of a misfire of a comburent-combustible mixture (for example, an air-fuel mixture) in the combustion chamber of the cylinder in the engine by measuring the value of the integral of the ionization current with an integrating circuit which is very easy to realize, reliable and accurate enough for the considered application, also considerably reducing the computational calculation required of the Electronic Control Unit positioned outside the coil.

The integrating circuit of the disclosure is reliable because it reduces the risk of detecting false misfire alarms or false events of the presence of combustion, because it provides the Electronic Control Unit with the value of the integral of the ionization current, by means of which the Electronic Control Unit is able to detect the presence or absence of a misfire.

According to a first aspect of the present disclosure, it is disclosed an electronic device to control an ignition coil of an internal combustion engine, the electronic control device comprising:

- a high-voltage switch connected in series to a primary winding of a coil and configured to switch between a closed position and an open position;
- a driving unit configured to:
  - control the closure of the high-voltage switch during a phase of charging energy into the primary winding;
  - control the opening of the high-voltage switch during a phase of transfer of energy from the primary winding to a secondary winding of the coil and during a phase of measurement of an ionization current subsequent to the phase of transfer of energy, wherein said ionization current is generated by the ions produced during the process of combustion of the comburent-combustible mixture in the combustion chamber of a cylinder of the engine by means of the spark generated by a spark plug in the phase of transfer of energy;
- a bias circuit configured to generate said ionization current during the phase of measurement of the ionization current, wherein said bias circuit is connected in series to a second terminal of the secondary winding;
- an integrating circuit interposed between the bias circuit and a reference voltage; wherein said integrating circuit comprises an integrating capacitor connected in series to the bias circuit and connected between the bias circuit and the reference voltage, wherein said integrating capacitor is configured to:
- completely discharge by means of the current flowing through the secondary winding during the phase of transfer of energy from the primary winding to the secondary winding;
- charge to a value different from zero during the phase of measurement of the ionization current so as to measure a value of the integral of the ionization current, in the case of the correct ignition of the comburent-combustible mixture;
- maintain a substantially null charge during the phase of measurement of the ionization current so as to measure a substantially null value of the integral of the ionization current, in the case of a misfire of the comburent-combustible mixture.

In one embodiment, the integrating circuit comprises the connection in parallel of the integrating capacitor and of a Zener diode, the Zener diode having an anode terminal connected to the bias circuit and having a cathode terminal connected towards the reference voltage, wherein during the phase of measurement of the ionization current the Zener diode is reversely biased and it is configured to limit the voltage across the integrating capacitor during its charging to a maximum defined value equal to the Zener voltage of the Zener diode, and wherein during the phase of transfer of energy the Zener diode is forwardly biased and it is configured to bias the voltage across the integrating capacitor to a substantially null value.

In one embodiment, the bias circuit comprises a connection in parallel of a bias capacitor and of a further Zener diode, the further Zener diode having an anode terminal connected to the integrating circuit and having a cathode terminal connected to the second terminal of the secondary winding, wherein the bias capacitor is configured to:

- charge during the phase of transfer of energy, by means of the current flowing through the secondary winding generated by the spark of the spark plug;
- discharge at least partially by means of the ionization current during the phase of measurement of the ionization current;

wherein during the phase of transfer of energy the further Zener diode is reversely biased and it is configured to limit the voltage across the bias capacitor during its charging to a maximum defined value equal to the Zener voltage of the further Zener diode.

In one embodiment, said integrating capacitor is further configured to:

- in case wherein a pre-ignition of the comburent-combustible mixture in the combustion chamber during the phase of charging occurs, pre-charge during the phase of charging energy into the primary winding by means of the ionization current flowing through the secondary winding during the phase of charging, so as to measure a value of the integral of the ionization current which flows through the secondary winding during the phase of charging due to said pre-ignition;
- in case wherein the pre-ignition of the comburent-combustible mixture does not occur, maintain the charge state substantially constant during the phase of charging energy.

In accordance with a second aspect of the present disclosure, it is disclosed an electronic ignition system for detecting a misfire in an internal combustion engine, the system comprising:

- a coil having the primary winding with a first terminal connected to a battery voltage and having the secondary winding with a first terminal connected to a spark plug;
- an electronic control device according to the first aspect of the disclosure, wherein the primary winding has a second terminal connected to the high-voltage switch;

- an electronic control unit connected to the driving unit of the electronic control device and comprising an output terminal adapted to generate an ignition signal having a first value for indicating the start of the phase of charging the primary winding and having a second value indicating the start of the phase of transfer of energy from the primary winding to the secondary winding, and wherein the driving unit is further configured to receive the ignition signal and generate, as a function thereof, a control signal for opening and closing the high-voltage switch.

In one embodiment, the electronic device according to the second aspect of the disclosure further comprises a local control unit connected to the integrating circuit and to the electronic control unit, wherein the local control unit comprises:

- a first input terminal adapted to receive the ignition signal;
- a second input terminal adapted to receive an integrating voltage signal representative of the voltage across the integrating capacitor;
- an output terminal adapted to generate a combustion monitoring signal carrying, during the phase of charging energy, a voltage pulse having a length increasing with the increase of the value of the integrating voltage signal in the phase of measurement of the ionization current of the previous cycle;

wherein the electronic control unit further comprises an input terminal adapted to receive the combustion monitoring signal, and wherein the electronic control unit is configured to detect the presence or absence of a misfire as a function of the comparison between the length of said voltage pulse and an ignition threshold.

In one embodiment, the electronic device according to the second aspect of the disclosure further comprises:

- a local control unit connected to the integrating circuit and to the electronic control unit;
- a current generator adapted to generate a trigger current controlled by the local control unit;

wherein the local control unit comprises:

- a first input terminal adapted to receive the ignition signal;
- a second input terminal adapted to receive an integrating voltage signal representative of the voltage across the integrating capacitor;
- an output terminal adapted to generate a control signal of the current of said current generator;

wherein the current generator is configured to generate, during the phase of charging energy, a current pulse having two variation edges that define a distance increasing with the increase of the value of the integrating voltage signal in the phase of measurement of the ionization current of the previous cycle, and wherein the electronic control unit is configured to detect the presence or absence of a misfire as a function of the comparison between the distance of said current pulse and an ignition threshold.

In one embodiment, the value of the ignition threshold is variable and depends at least on the number of engine revolutions and on the engine load.

In one embodiment, the bias circuit and the integrating circuit are enclosed in a single casing.

In one embodiment, said casing further comprises the high-voltage switch and the driving unit.

In one embodiment, the electronic control unit, the high-voltage switch and the driving unit are enclosed in a further casing.

The Applicant has further perceived that the integrating circuit of the disclosure also allows detecting in a simple and reliable manner a pre-ignition of the comburent-combustible mixture that occurs during the phase of charging energy into the primary winding, for example caused by a fouling of the plug itself.

Moreover, the electronic control device and the electronic ignition system according to the present disclosure provide at least two possible, particularly efficient solutions for transferring the information of the measurement of the integral of the ionization current to an electronic control unit positioned outside the coil, in order to detect the presence or absence of the misfire of the comburent-combustible mixture and/or the presence of pre-ignition of the comburent-combustible mixture in the phase of charging energy in the primary winding.

BRIEF DESCRIPTION OF THE SEVERAL VIEWS OF THE DRAWINGS

Additional features and advantages of the disclosure will become more apparent from the description which follows of a preferred embodiment and the variants thereof, provided by way of example with reference to the enclosed drawings, in which.

DETAILED DESCRIPTION

It should be observed that in the following description, identical or analogous blocks, components or modules are indicated in the figures with the same numerical references, even if they are shown in different embodiments of the disclosure.

Figure 1A:
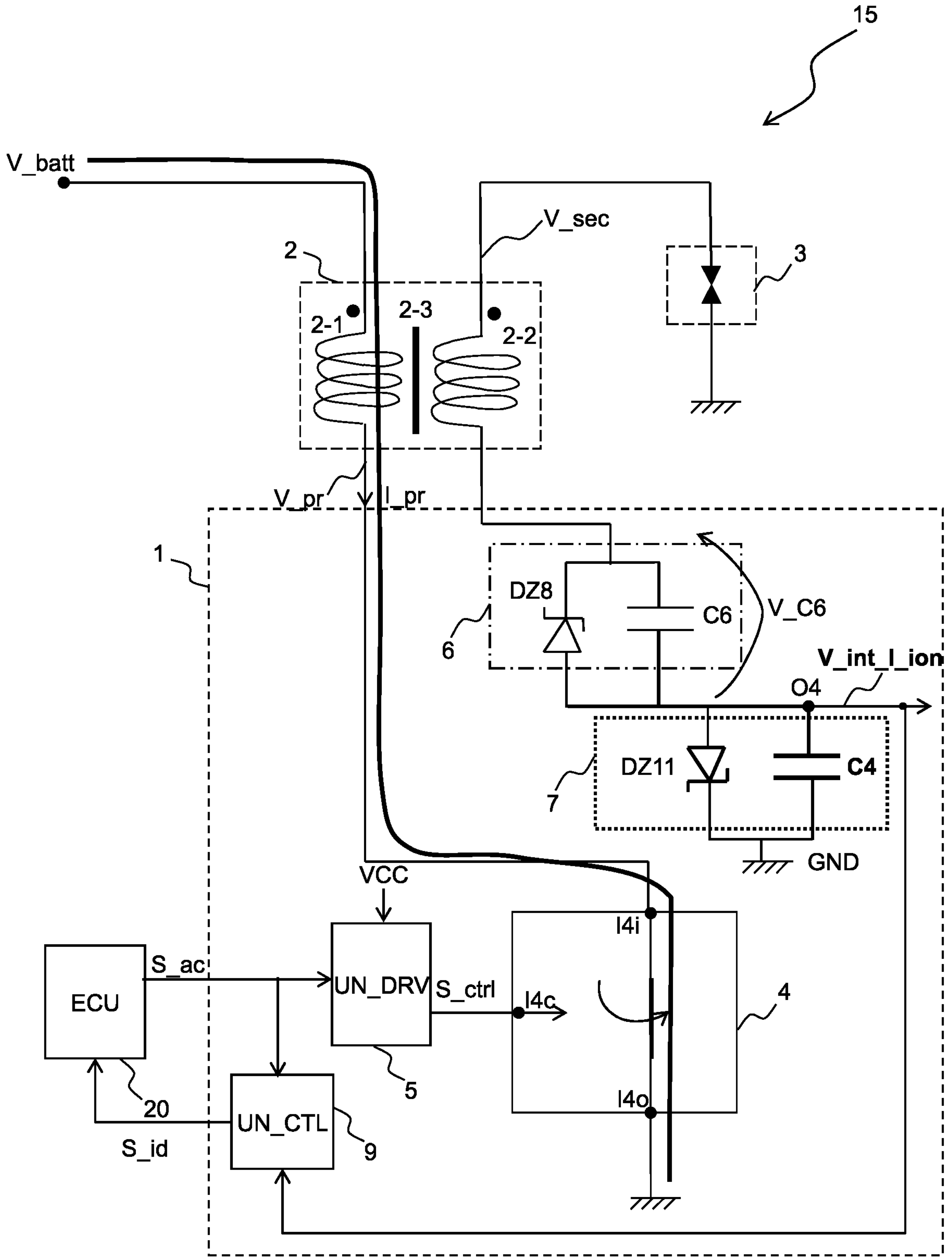
FIGS. 1A-1C show the block diagrams of an electronic ignition system according to one embodiment of the disclosure.
Figure 1B:
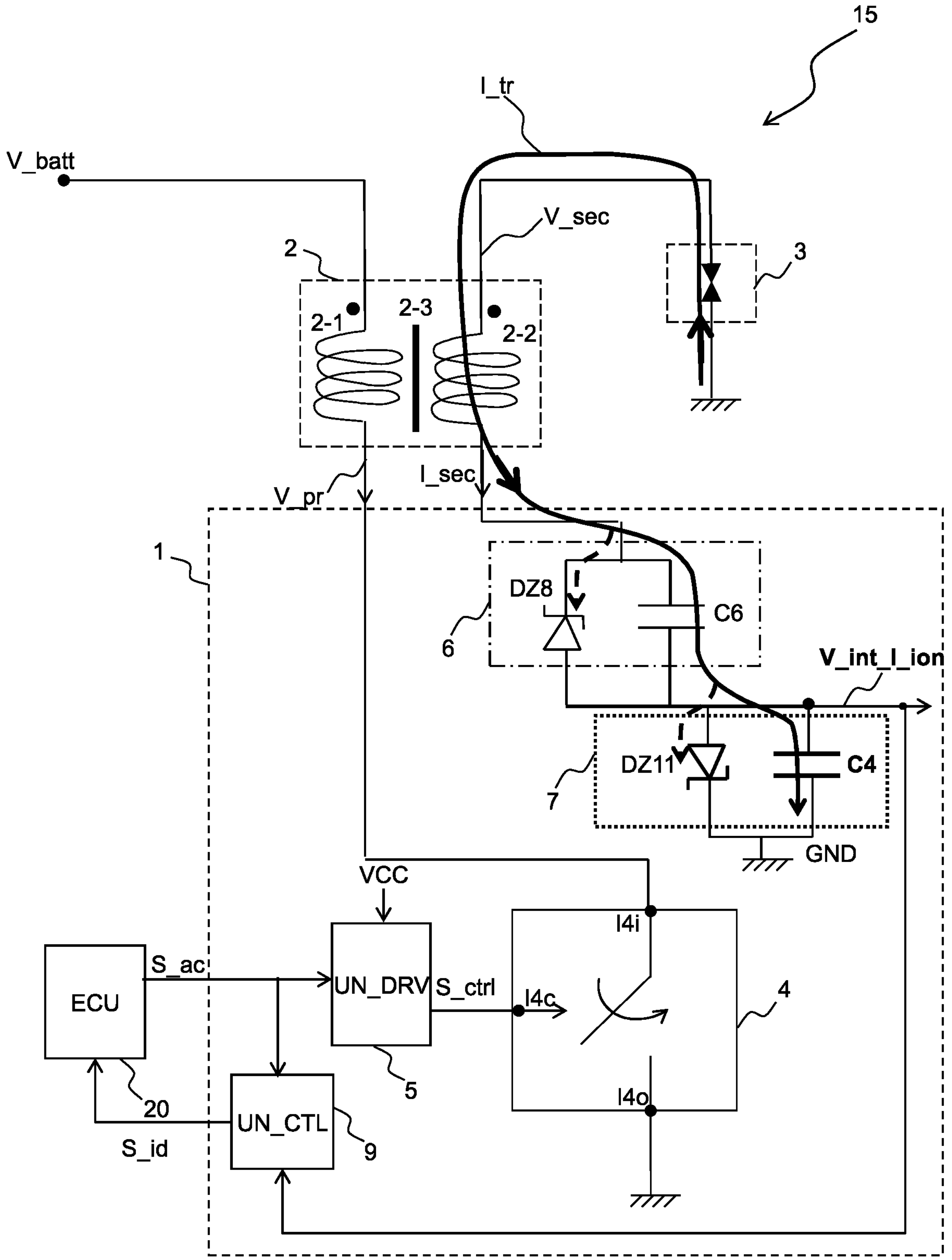
Figure 1C:
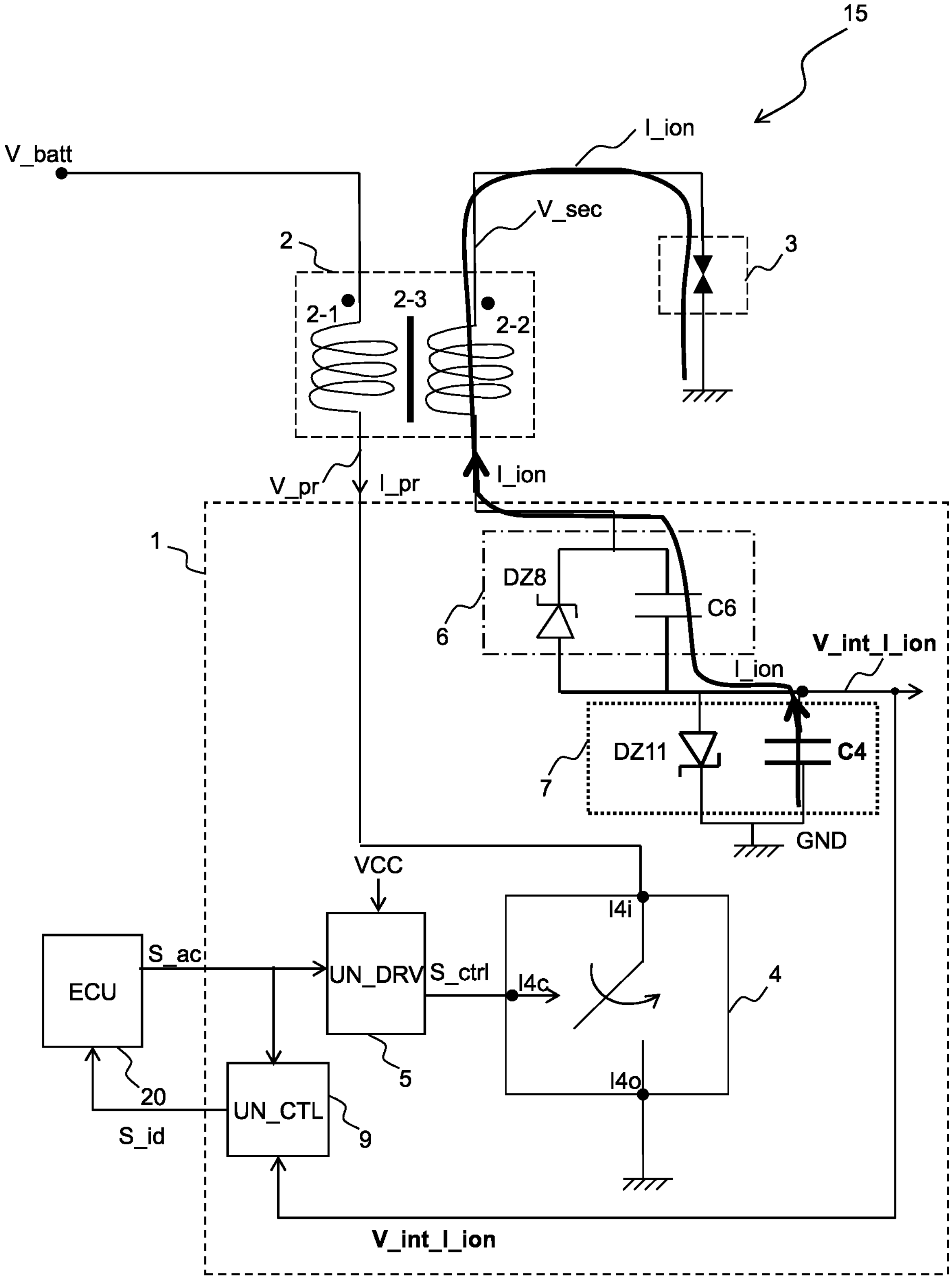

With reference to FIGS. 1A, 1B, 1C, they show an electronic ignition system 15 for an internal combustion engine according to the embodiment of the disclosure.

The electronic ignition system 15 can be mounted on any motorized vehicle, such as for example a motor vehicle, a motorcycle or a lorry.

The ignition system 15 comprises:

an ignition coil 2;

a spark plug 3;

an electronic control device 1;

an Electronic Control Unit 20,

The Electronic Control Unit 20 (commonly indicated with ECU) is a processing unit (for example a microprocessor) which is positioned far enough away from the head of the internal combustion engine, so as not to be influenced by the high working temperature of the ignition coil 2.

The electronic control device 1 and the coil 2 are instead positioned near the engine head and are designed to tolerate the high working temperatures of the engine head.

The spark plug 3 is connected to the secondary winding 2-2 of the ignition coil 2.

In particular, the spark plug 3 comprises a first electrode connected to the secondary winding 2-2 and comprises a second electrode connected to the ground reference voltage.

The spark plug 3 has the function of generating a spark across their electrodes and the spark allows burning the air-fuel mixture contained in a cylinder of the internal combustion engine.

It should be observed that for the purposes of explanation of the disclosure, an air-fuel mixture is considered in the following, but more in general the disclosure is applicable to a mixture of a comburent (also different from air) with a combustible (also different from fuel).

The ignition coil 2 has a primary winding 2-1, a secondary winding 2-2 and a magnetic core 2-3 for inductively coupling the primary winding 2-1 with the secondary winding 2-2.

The ignition system 15 is configured to operate according to three operating phases:

- a first phase of charging, in which it is performed the charge of energy into the primary winding 2-1, by means of the primary current I_pr which flows through the primary winding 2-1 with an increasing trend;
- a second phase of transfer of energy, in which it is performed the transfer of energy from the primary winding 2-1 to the secondary winding 2-2, thus generating the spark on the electrodes of the spark plug 3 and thus burning the air/fuel mixture contained in the cylinder of the internal combustion engine;
- a third phase of measurement of the ionization current, in which it is performed the measurement of the integral of the ionization current I_ion, as it will be explained in more detail in the following.

The third phase of measurement of the ionization current further comprises a chemical phase and a subsequent thermal phase.

The electronic control device 1 comprises:

a driving unit 5;

a high-voltage switch 4;

a bias circuit 6;

an integrating circuit 7;

a local control unit 9.

In one embodiment, the electronic control device 1 is a single component that is enclosed in a casing, i.e. the driving unit 5, the high-voltage switch 4, the bias circuit 6 and the integrating circuit 7 are enclosed in a single casing; for example, the driving unit 5, the high-voltage switch 4, the bias circuit 6 and the integrating circuit 7 are mounted on the same printed circuit board.

Alternatively, the bias circuit 6 and the integrating circuit 7 are enclosed in a singlecasing, while the driving unit 5 and the high-voltage switch 4 are outside said casing; for example, the driving unit 5 and/or the high-voltage switch 4 are enclosed within the Electronic Control Unit 20.

The primary winding 2-1 comprises a first terminal adapted to receive a battery voltage V_batt (for example, equal to 12 Volts) and further comprises a second terminal connected to the high-voltage switch 4 and adapted to generate a primary voltage V_pr.

Furthermore, in the following a "voltage drop across the primary winding 2-1" will refer to the potential difference between the first terminal and the second terminal of the primary winding 2-1.

The secondary winding 2-2 is connected to the spark plug 3; in particular, the secondary winding 2-2 comprises a first terminal connected to a first electrode of the spark plug 3 and adapted to generate a secondary voltage V_sec and comprises a second terminal connected towards a ground reference voltage through the bias circuit 6 and the integrating circuit 7 as shown in FIGS. 1A-1C.

In the following "primary current" I_pr will be used to indicate the current flowing through the primary winding 2-1 and "secondary current" I_sec will be used to indicate the current flowing through the secondary winding 2-2 during the second phase of transfer of energy from the primary winding 2-1 to the secondary winding 2-2.

In one embodiment, a resistor is interposed between the spark plug 3 and the secondary winding 2-2, having the function of attenuating the noise.

The high-voltage switch 4 is connected in series to the primary winding 2.1.

The term "high-voltage" means that the voltage of the terminal I4*i* of the switch 4 is greater than 200 Volts.

In particular, the high-voltage switch 4 comprises a first terminal I4*i* connected to the second terminal of the primary winding 2.1, comprises a second terminal I4*o* connected to the ground reference voltage and comprises a control terminal I4*c* connected to the driving unit 5.

The high-voltage switch 4 is switchable between a closed position and an open position, as a function of the value of a control signal S_ctrl received on the control terminal I4*c*.

In one embodiment, the high-voltage switch 4 is implemented with an IGBT type transistor (Insulated Gate Bipolar Transistor) having a collector terminal which coincides with the terminal I4*i*, having an emitter terminal that coincides with the terminal I4*o* and having a gate terminal that coincides with the terminal I4*c*; in this case the primary voltage V_pr is thus equal to the voltage of the collector terminal of the IGBT transistor 4.

In particular, the IGBT transistor 4 is configured to operate in the saturation zone when it is closed and in the cut-off zone when it is open.

The IGBT transistor 4 is configured to operate with voltage values greater than 200 Volts.

Alternatively, the high-voltage switch 4 can be implemented with a field effect transistor (MOSFET, JFET) or with two bipolar junction transistors (BJT) or it can be a solid-state switch (relay).

The driving unit 5 is supplied with a supply voltage VCC less than or equal to the battery voltage V_batt.

For example, if we suppose that the value of the battery voltage V_batt is 12 V, the value of the supply voltage VCC can be 8.2 V, 5 V or 3.3 V.

The bias circuit 6 has the function of biasing the spark plug 3 so as to generate a flow of ionization current I_ion during the third phase of measurement of the ionization current, as will be explained in more detail below.

The bias circuit 6 is interposed between the second terminal of the secondary winding 2-2 and the integrating circuit 7.

In one embodiment, the bias circuit 6 comprises the parallel connection of a first capacitor C6 (hereinafter indicated with "bias capacitor") and a first Zener diode DZ8, electrically connected as shown in FIGS. 1A-1C.

The bias capacitor C6 comprises a first terminal connected to the cathode terminal of the first Zener diode DZ8, which are connected to the second terminal of the secondary winding 2-2.

The bias capacitor C6 comprises a second terminal connected to the integrating circuit 7.

The bias capacitor C6 has the function of generating electrical energy to force the ionization current I_ion to flow after the end of the spark of the plug 3.

In fact, the bias capacitor C6 is charged during the second phase of transfer of energy from the primary winding to the secondary winding and is discharged at least partially by means of the ionization current I_ion during the third phase of measurement of the ionization current I_ion.

In the following V_C6 will be used to indicate the voltage drop across the bias capacitor C6.

It should be noted that the value of the capacitance of the bias capacitor C6 is much lower than the value of the capacitance of the capacitors used in bias circuits according to the known solutions that measure the ionization current, as will be explained in more detail in the following.

For example, the capacitance of the bias capacitor C6 is comprised between 10 nano Farad and 150 nano Farad.

Figure 2A:
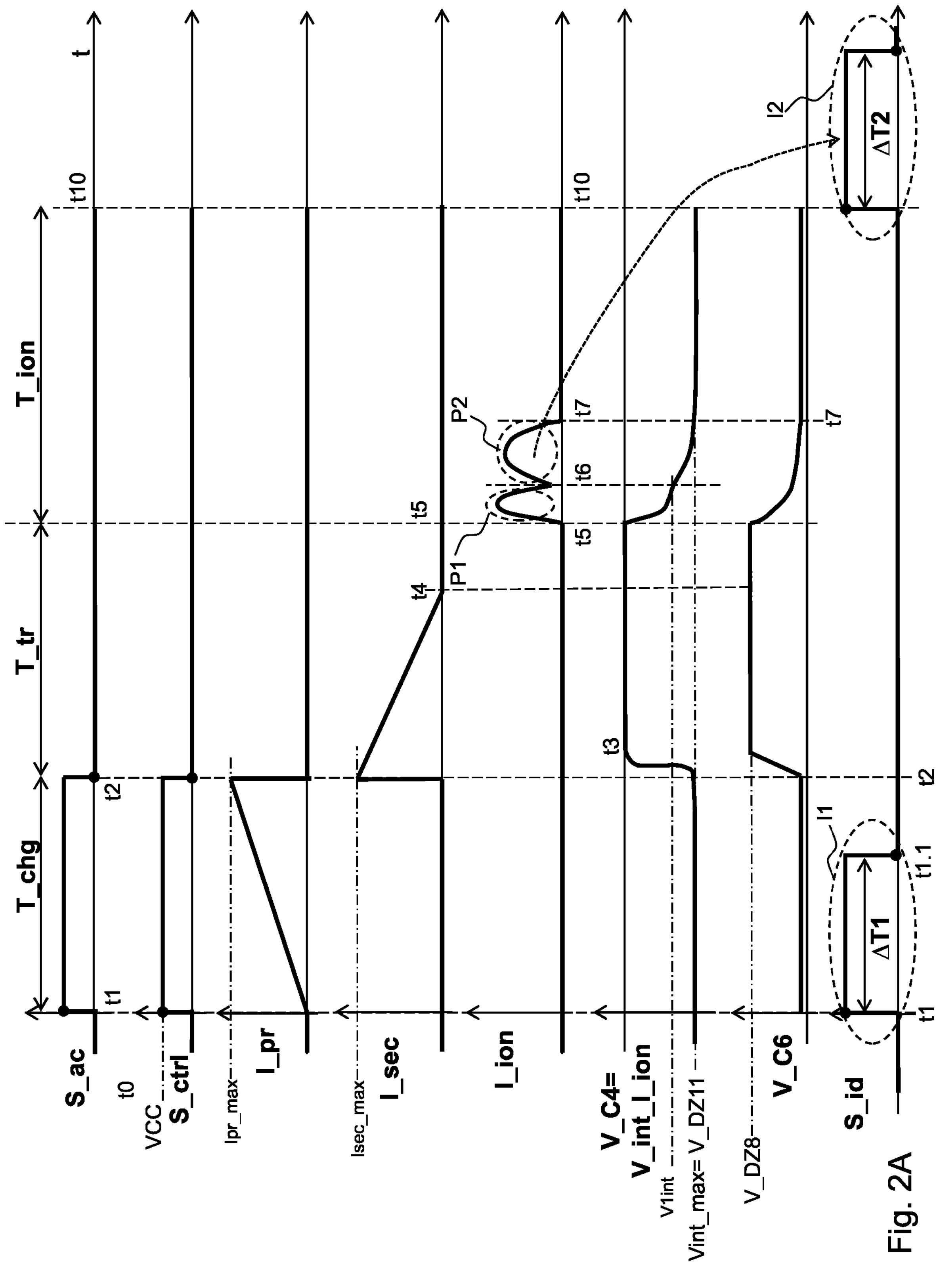
FIGS. 2A-2C schematically show a possible trend of some signals generated in the electronic ignition system during three combustion cycles according to the embodiment of the disclosure, in case wherein two correct ignitions of the comburent-combustible mixture and a misfire of the comburent-combustible mixture occur.

In the third phase of measurement of the ionization current the bias capacitor C6 can be discharged (partially or fully) both approximately at the end of the ionization current (as shown in FIG. 2A), or shortly after or shortly before the end of the ionization current I_ion.

The first Zener diode DZ8 comprises the cathode terminal connected to the second terminal of the secondary winding 2-2 and comprises the anode terminal connected to the integrating circuit 7.

The first Zener diode DZ8 is configured to have a first operation mode in which the voltage drop across itself is equal to the Zener voltage Vz (for example, equal to 200 Volts) when it is reversely biased (i.e. when the voltage of the anode terminal is less than that of the cathode terminal), and it is configured to have a second operation mode in which it operates as a normal diode when it is forwardly biased (i.e. when the voltage of the anode terminal is greater than that of the cathode terminal, for example approximately 0.7 Volts).

During the second phase of transfer of energy, the first Zener diode DZ8 is reversely biased and it has the function of limiting the value of the voltage across the bias capacitor C6 which is charged up to reaching a maximum value equal to the Zener voltage of the first Zener diode DZ8, which will be indicated hereinafter with V_DZ8 (for example, V_DZ8 is equal to 200 Volts).

During the third phase of measurement of the ionization current the first Zener diode DZ8 is forwardly biased; for example, the voltage across the first Zener diode DZ8 is equal to about 0.7 Volts.

The integrating circuit 7 has the function of measuring the value of the integral of the ionization current I_ion, performing a current-voltage conversion and generating an integrating voltage signal V_int_I_ion representative of the value of the integral of the ionization current I_ion measured during the third phase of the ignition cycle, as will be explained in more detail in the following.

The integrating circuit 7 is connected between the bias circuit 6 and the ground reference voltage.

During the second phase of transfer of energy (in which the spark on the electrodes occurs) it is performed the reset of the integrating circuit 7 so as to allow to perform the measurement of the integral of the ionization current I_ion during the third phase, as will be explained in more detail in the following.

More in particular, the integrating circuit 7 comprises the parallel connection of a second capacitor C4 (hereinafter indicated with "integrating capacitor") and a second Zener diode DZ11, as shown in FIGS. 1A-1C.

The integrating capacitor C4 comprises a first terminal connected to the anode terminal of the second Zener diode DZ11, which are connected to the bias circuit 6, in particular connected to the second terminal of the bias capacitor C6 and the anode terminal of the first Zener diode DZ8.

The integrating capacitor C4 further comprises a second terminal connected to the cathode terminal of the second Zener diode DZ11, which are connected to the ground reference voltage.

The integrating capacitor C4 has the function of storing (during the third phase of measurement of the ionization current I_ion) the charge generated by the flow of the ionization current I_ion, thus measuring a value which is function of the integral of the ionization current I_ion; in particular, the value measured by means of the integrating capacitor C4 increases (for example, directly proportional) with the increase in the value of the integral of the ionization current I_ion.

Furthermore, the integrating capacitor C4 is automatically completely discharged (of its possible residual charge) during the second phase of transfer of energy by means of the pulse of the secondary current I_sec flowing through the secondary winding 2-2, i.e. when the spark occurs between the electrodes of the spark plug 3.

Therefore the integrating voltage signal V_int_I_ion represents the voltage across the integrating capacitor C4, which is function (for example, it is directly proportional) of the value of the integral of the ionization current I_ion measured during the third phase of measurement of the ionization current I_ion.

The second Zener diode DZ11 comprises the anode terminal connected to the first terminal of the integrating capacitor C4, which are connected to the bias circuit 6, in particular connected to the second terminal of the bias capacitor C6 and to the anode terminal of the first Zener diode DZ8.

The second Zener diode DZ11 further comprises the cathode terminal connected to the integrating capacitor C4, which are connected to the ground reference voltage.

The second Zener diode DZ11 is configured to have a first operation mode in which the voltage across itself is equal to the Zener voltage Vz (for example, equal to 15 Volts) when it is reversely biased (i.e. when the voltage of the anode terminal is less than that of the cathode terminal), and it is configured to have a second operation mode in which it operates as a normal diode when it is forwardly biased (i.e. when the voltage of the anode terminal is greater than that of the cathode terminal by approximately 0.7 Volts).

During the third phase of measurement of the ionization current I_ion, the second Zener diode DZ11 is reversely biased and it has the function of limiting the value of the integrating voltage V_int_I_ion across the integrating capacitor C4 to a maximum value equal to the Zener voltage V_DZ11 of the second Zener diode DZ11, in case wherein the value of the integrating voltage V_int_I_ion in the third phase reaches a high value: this allows connecting (directly or indirectly) the first terminal of the integrating capacitor C4 to the local control unit 9 (for example, a small microprocessor), without damaging it.

For example, the Zener voltage V_DZ11 of the second Zener diode DZ11 is equal to 15 Volts and thus the value of the integrating voltage V_int_I_ion across the integrating capacitor C4 is limited to a value Vint_max=V_DZ11=−15 Volts, i.e. the voltage drop across the integrating capacitor C4 (during the third phase of measurement of the ionization current) is limited to a defined negative value equal to −15 Volts.

During the second phase of transfer of energy, the second Zener diode DZ11 is forwardly biased and it has the function of maintaining the voltage across the integrating capacitor C4 to a substantially null value; for example, during the second phase of transfer of energy the voltage across the integrating capacitor C4 is limited to a positive value equal to approximately 0.7 Volts.

The Electronic Control Unit 20 has the function of controlling the operation of the ignition coil 2, with the aim of generating the spark across the spark plug 3 at the correct instant.

In particular, the Electronic Control Unit 20 comprises an output terminal adapted to generate the ignition signal S_ac having a transition from a first to a second value (for example, from a logical low to high value) so as to terminate the first phase of charging of the primary winding 2-1 and activate the second phase of transfer of energy from the primary winding 2-1 to the secondary winding 2-2, as will be explained in greater detail below.

The driving unit 5 (for example, a micro-controller) has the function of controlling the operation of the high-voltage switch.

The driving unit 5 comprises a first input terminal adapted to receive an ignition signal S_ac having a transition from one value to another (for example, a transition from a logical high to low value, or vice versa) and comprises a first output terminal adapted to generate, as a function of the value of the ignition signal S_ac, the control signal S_ctrl for driving the opening or closing of the high-voltage switch 4.

In particular, the driving unit 5 is configured to receive the ignition signal S_ac having a first value (for example a logical high value) and to generate the control signal S_ctrl having a first value (for example, a voltage value greater than zero) for driving the closing of the high-voltage switch 4.

Furthermore, the driving unit 5 is configured to receive the ignition signal S_ac having a second value (for example a logical low value) and to generate the control signal S_ctrl having a second value (for example, a null voltage value) for driving the opening of the high-voltage switch 4, thus suddenly interrupting the primary current flow I_pr flowing through the primary winding 2-1: this causes a voltage pulse on the second terminal of the primary winding 2-1 of a short length, typically with peak values of 200-450 V and having a length of a few micro-seconds.

Consequently, the energy stored into the primary winding 2-1 is transferred to the secondary winding 2-2; in particular, a high-value voltage pulse is generated on the first terminal of the secondary winding 2-2, typically 15-50 kV, which is sufficient to trigger the spark between the electrodes of the spark plug 3.

The local control unit 9 (for example, a microprocessor or a micro-controller) has the function of collecting and transferring to the Electronic Control Unit 20 the information of the value of the integral of the ionization current I_ion, for the purpose of detecting the presence or absence of a misfire of the air-fuel mixture in the combustion chamber of the cylinder in which the spark plug 3 is positioned, by means of the use of a separate communication channel.

The misfire can be caused for example by a faulty injector, or by the faulty spark plug 3 or for other causes inside the combustion chamber.

The local control unit 9 is electrically connected to the integrating circuit 7 and to the Electronic Control Unit 20.

In particular, the local control unit 9 comprises a first input terminal adapted to receive the ignition signal Sac, comprises a second input terminal adapted to receive the integrating voltage signal V_int_I_ion representative of the voltage V_C4 across the integrating capacitor C4 of the integrating circuit 7 (i.e. representative of the integral of the ionization current I_ion) and comprises an output terminal adapted to generate a combustion monitoring voltage S_id carrying a voltage pulse for each cycle (see I1, I2, I3, I4 in FIGS. 2A-C) having a length ΔT (see ΔT1, ΔT2, ΔT3, ΔT4 in FIGS. 2A-C) which depends on the measured value of the integral of the ionization current I_ion in the previous cycle, i.e. ΔT is a function of the detected value of the integrating voltage V_int_I_ion in the previous cycle.

It should be observed that the value of the integrating voltage V_int_I_ion generated during the third phase of measurement of the ionization current I_ion has a negative trend and thus an inverter is used inside the control unit 9 so as to generate an integrating voltage having a positive trend.

The combustion monitoring voltage S_id will be used by the Electronic Control Unit 20 to detect in each combustion cycle the presence or absence of a misfire of the air-fuel mixture in the combustion chamber of the cylinder in which the spark plug 3 is mounted, as will be explained in more detail in the following.

In particular, the length ΔT of the voltage pulse of the combustion monitoring voltage S_id is function (for example, is directly proportional) of the measured value of the integral of the ionization current I_ion in the previous ignition cycle, i.e. it is function (for example, directly proportional) of the value of the integrating voltage V_int_I_ion detected across the integrating capacitor C4 in the previous ignition cycle.

Figure 2B:
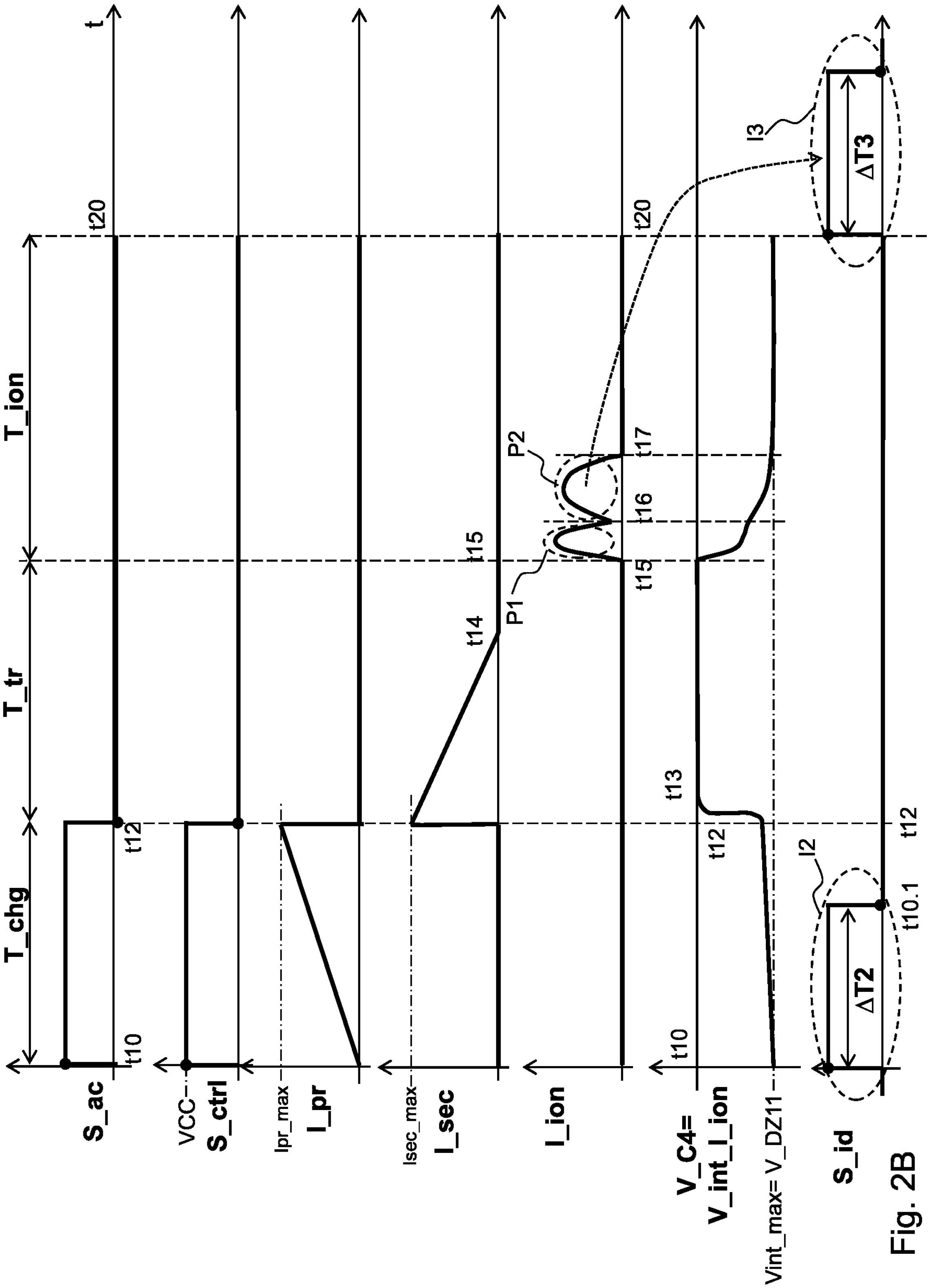
Figure 2C:
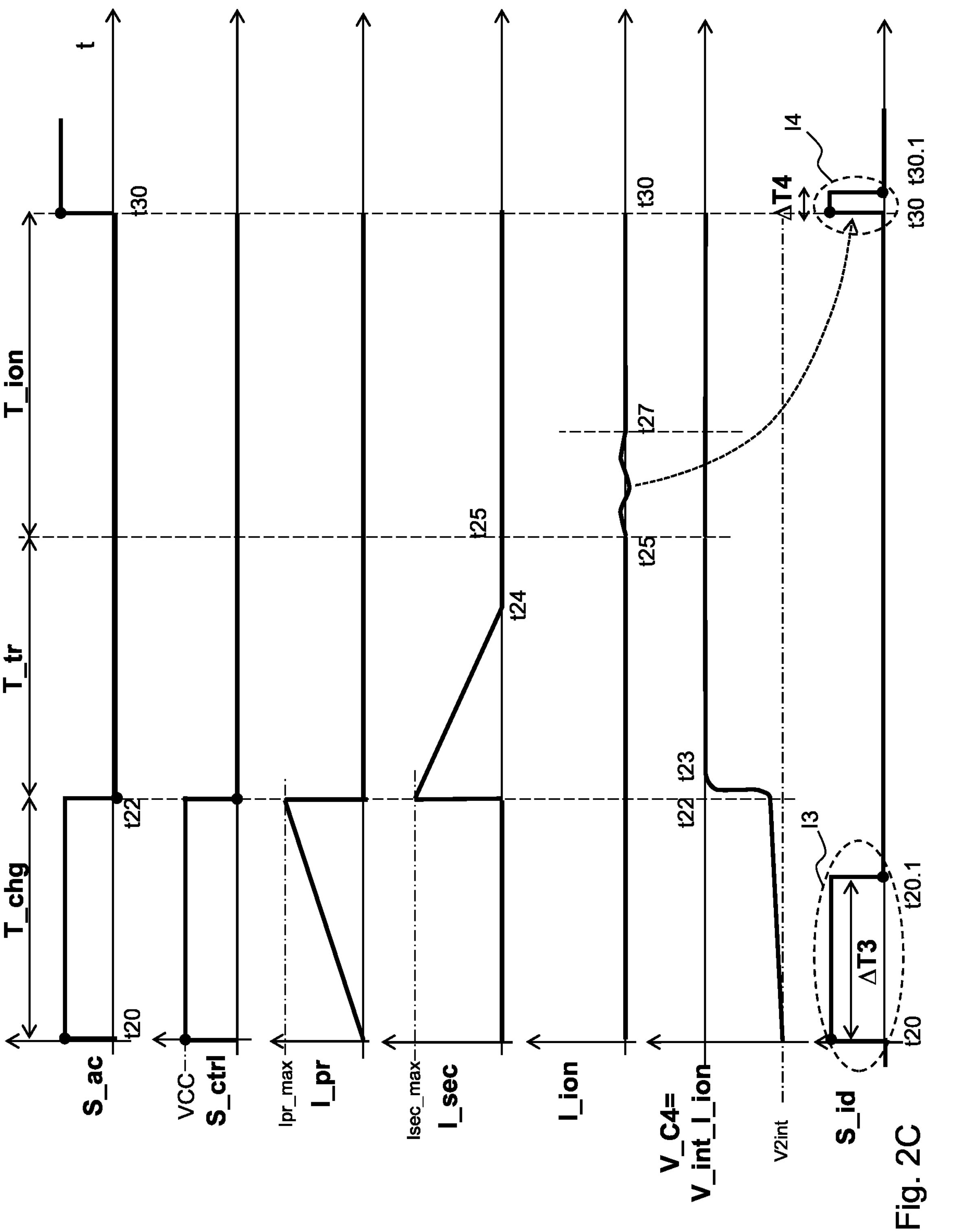

The control unit 9 in the previous cycle is thus configured to generate the combustion monitoring voltage S_id as a function of the ignition signal S_ac and as a function of the integrating voltage signal V_int_I_ion carrying the measured value of the integral of the ionization current I_ion in the previous ignition cycle:

- when the ignition signal S_ac has an increasing edge (see the instants t1, t10, t20, t30 in FIG. 2A-C), an increasing edge is generated in the voltage pulse of the combustion monitoring voltage S_id (see the increasing edges of the voltage pulses I1, I2, I3, I4 in FIG. 2A-C):
- the length ΔT of the voltage pulse of the combustion monitoring voltage S_id is function (for example, directly proportional) of the value of the integrating voltage V_int_I_ion of the phase of measurement of the ionization current I_ion in the previous ignition cycle (see the decreasing edges at the instants t1.1, t10.1, t20.1, t30.1 of the pulses I1, I2, I3, I4 with the respective lengths ΔT1, ΔT2, ΔT3, ΔT4 in FIG. 2A-C).

Therefore the Electronic Control Unit 20 has the further function of detecting the presence or absence of a misfire of the air-fuel mixture in the combustion chamber of the cylinder in which the spark plug 3 is mounted.

In this case the Electronic Control Unit 20 comprises an input terminal adapted to receive the combustion monitoring voltage S_id carrying, for each ignition cycle, a voltage pulse having a length ΔT that depends on the measured value of the integral of the ionization current I_ion.

The Electronic Control Unit 20 is thus configured to detect, as a function of the measured value of the integral of the ionization current I_ion, the presence or absence of a misfire of the air-fuel mixture in the combustion chamber of the cylinder in which the spark plug 3 is mounted.

More in particular, the Electronic Control Unit 20 performs, for each ignition cycle, a comparison of the length ΔT of the voltage pulse (which depends on the measured value of the integral of the ionization current I_ion) with respect to an ignition threshold, in order to detect the presence or absence of a misfire in each ignition cycle.

In one embodiment, the value of the ignition threshold is variable and depends on the operating conditions of the engine, such as for example the number of engine revolutions and the engine load.

The Electronic Control Unit 20 also has the function of detecting, as a function of the measured value of the integral of the ionization current I_ion, a presence or absence of a pre-ignition of the air-fuel mixture or a fouling of the spark plug 3, i.e. the presence of an undesired spark during the phase of charging the primary winding 2-1 is detected.

FIG. 1A shows the electronic ignition system 15 during the first phase of charging energy in the primary winding 2-1, in which the high-voltage switch 4 is closed: in this configuration a current flow I_chg flows (see FIG. 1A) from the battery voltage V_batt towards ground, crossing the first primary winding 2-1, and the high-voltage switch 4; therefore the value of said current flow I_chg is equal to the value of the primary current I_pr flowing in the primary winding 2-1.

FIG. 1B shows the electronic ignition system 15 during the second phase of transfer of energy from the primary winding 2-1 to the secondary winding 2-2, in which the high-voltage switch 10 is open: in this configuration a current flow I_tr flows (see FIG. 1B) through the spark plug 3, the secondary winding 2-2, the bias circuit 6 and the integrating circuit 7.

FIG. 1C shows the electronic ignition system 15 during the third phase of measurement of the ionization current I_ion and it shows the generation of the integrating voltage signal V_int_I_ion representative of the value of a measurement of the integral of the ionization current I_ion.

It can be observed that the high-voltage switch 4 is open and the ionization current I_ion flows through the integrating circuit 7, the bias circuit 6, the secondary winding 2-2 and the spark plug 3 (see FIGS. 1C and 2C again).

With reference to FIGS. 2A-2C, they show a possible trend of the ignition signal S_ac, of the control signal S_ctrl, of the primary current I_pr, of the secondary current I_sec, of the ionization current I_ion, of the integrating voltage V_int_I_ion and of the combustion monitoring voltage S_id according to the embodiment of the disclosure.

It should be noted that for the purposes of explaining the disclosure, FIGS. 2A-2C show the signal of the secondary current I_sec separate from that of the ionization current I_ion, but in reality it is the current that flows through the secondary winding 2-2 in two different phases of operation of the electronic ignition system 15, respectively in the second phase of transfer of energy having a length T_tr and in the third phase of measurement of the ionization current having a length T_ion: this separation is also useful because the order of magnitude of the current is different, i.e. hundreds of mA [milli Amperes] in the case of the secondary current I_sec in the second phase of transfer of energy and hundreds of μA [micro Amperes] in the case of the ionization current I_ion.

Note that the signals represented in FIGS. 2A-C are not in scale and that the content of the description takes precedence over the values derived from the signals.

FIG. 2A shows a first ignition cycle comprised between t1 and t10 and FIG. 2B shows a second ignition cycle comprised between the instants t10 and t20: in both cycles a correct combustion of the air-fuel mixture occurs in the combustion chamber of the cylinder in the engine, i.e. a correct spark occurs between the electrodes of the spark plug 3.

Differently, FIG. 2C shows a third ignition cycle comprised between the instants t10 and t20 in which a misfire of the air-fuel mixture occurs in the combustion chamber of the cylinder in the engine, i.e. in the second phase of transfer of energy a spark does not occur between the electrodes of the spark plug 3.

The trend of the signals continues in ignition cycles subsequent to the third, of which only a portion of a fourth cycle following the third cycle is shown.

It can be observed for the first and second ignition cycle that the three phases of operation of the electronic ignition system 15 are present:

- the first phase of charging the primary winding 2-1 has a length T_chg and it is comprised between the instants t1 and t2 for the first cycle, between the instants t10 and t12 for the second cycle: in these instants the integrating circuit 7 begins to be reset, in particular the integrating capacitor C4 begins to discharge slowly and it is partially discharged through the load seen from the terminal O4 of the integrating capacitor C4;
- the second phase of transfer of energy from the primary winding 2-1 to the secondary winding 2-2 has a length T_tr and it is comprised between the instants t2 and t5 for the first cycle, between the instants t12 and t15 for the second cycle: in these instants it is supposed that the spark is correctly generated across the electrodes of the spark plug 3, the integrating circuit 7 is reset (in particular, the integrating capacitor C4 is quickly discharged towards a substantially null value) and moreover the bias capacitor C6 of the bias circuit 6 is charged until it reaches the value of the Zener voltage V_DZ8 of the first Zener diode DZ8;
- the third phase of measurement of the ionization current and generation of the integrating voltage V_int_I_ion has a length T_ion and it is comprised between the instants t5 and t10 for the first cycle, between the instants t15 and t20 for the second cycle: in these instants the bias capacitor C6 of the bias circuit 6 operates as a generator of electrical energy to force the ionization current I_ion to flow and thus the bias capacitor C6 of the bias circuit 6 is discharged at least partially by means of the flow of the ionization current I_ion, moreover a value is measured (by means of the detection of the integrating voltage V_int_I_ion across the integrating capacitor C4) which is a function (for example, directly proportional) of the integral of the ionization current I_ion by means of the charging of the integrating capacitor C4 until the integrating voltage V_int_I_ion reaches a maximum value Vint_max (limited to the Zener voltage V_DZ11 of the Zener diode DZ11, in case wherein the value of the integral of the ionization current I_ion is a high value).

Moreover, it can be observed that also for the third ignition cycle three phases of operation of the electronic ignition system 15 are present:

- the first phase of charging the primary winding 2-1 has a length T_chg and it is comprised between the instants t20 and t22: in these instants it is performed the charge of energy into the primary winding 2-1 and the integrating capacitor C4 is partially and slowly discharged;
- the second phase of transfer of energy from the primary winding 2-1 to the secondary winding 2-2 has a length T_tr and it is comprised between the instants t22 and t25: in these instants it is supposed that a misfire of the air-fuel mixture occurs in the combustion chamber in which the spark plug 3 is mounted;
- the third phase of measurement of the ionization current and generation of the integrating voltage V_int_I_ion has a length T_ion and it is comprised between the instants t25 and t30: unlike the third phase of the first and second cycle, in this third phase of the third cycle the ionization current I_ion is substantially null due to a misfire of the air-fuel mixture and thus the integrating capacitor C4 is not charged (i.e. it remains discharged at a substantially null value, for example 0.7 Volts), thus a substantially null value (i.e. very small) is measured (by means of the detection of the integrating voltage V_int_I_ion) of the integral of the ionization current I_ion.

In more detail, in the first phase of charging (instants comprised between t1 and t2 for the first cycle, between t10 and t12 for the second cycle and between t20 and t22 for the third cycle) the high-voltage switch 4 is closed, the primary current I_pr has an increasing trend from the null value to the maximum value Ipr_max, the value of the secondary current I_sec is substantially null, the ionization current I_ion is null and the integrating voltage signal V_int_I_ion is null (first cycle) or increases slowly (second cycle) towards the value of substantially null.

In the second phase of transfer of energy (time interval comprised between t2 and t5 for the first cycle, between t12 and t15 for the second cycle and between t22 and t25 for the third cycle) the following operation occurs:

- the high-voltage switch 4 is open, the primary current I_pr is substantially null, the secondary current I_sec has at the instants t2 (first cycle), t12 (second cycle) and t22 (third cycle) a pulse of maximum value Isec_max and then has a decreasing trend from the maximum value Isec_max until reaching the substantially null value respectively at the instants t4 (first cycle), t14 (second cycle) and t24 (third cycle);
- the capacitor C4 discharges quickly and thus the integrating voltage signal V_int_I_ion first quickly increases towards the null value at the beginning of the second cycle (i.e. between the instants t2 and t3 for the first cycle, between the instants t12 and t13 for the second cycle, between the instants t22 and t23 for the third cycle) until reaching a substantially null value (for example, approximately 0.7 Volts equal to the voltage across the forwardly biased Zener diode DZ11) and then the integrating voltage signal V_int_I_ion is maintained equal to a substantially null value (for example, approximately 0.7 Volts) for the remaining time interval of the second cycle (i.e. between the instants t3 and t5 for the first cycle, between the instants t13 and t15 for the second cycle, between the instants t25 and t25 for the third cycle);
- the ionization current I_ion is null during the entire second phase of the first, second and third cycle.

In particular, the integrating voltage V_int_I_ion is the voltage drop V_C4 across the integrating capacitor C4 and thus during the second phase of transfer of energy of the second cycle the integrating capacitor C4 discharges until reaching complete discharge at the instant t13 (not far from t12) in which the voltage drop across the integrating capacitor C4 is substantially null (for example, 0.7 Volts equal to the voltage drop across the forwardly biased Zener diode DZ11).

In the third phase of measurement of the ionization current (time interval comprised between t5 and t10 for the first cycle, between t15 and t20 for the second cycle and between t25 and t30 for the third cycle) the high-voltage switch 4 is open.

The primary current I_pr has null values after the instant t2 for the first cycle, after the instant t12 for the second cycle and after the instant t22 for the third cycle.

The secondary current I_sec is null in the instants comprised between t4 and t10 for the first cycle, between t14 and t20 for the second cycle and between t24 and t30 for the third cycle.

Furthermore the ionization current I_ion flows through the secondary winding 2-2 at the instants comprised between t5 and t7 for the first cycle and between t15 and t17 for the second cycle since the correct combustion of the air-fuel mixture occurred in the first and second cycle.

In particular, in the third phase of measurement of the ionization current of the first and second cycle, the ionization current I_ion has a first current peak P1 (chemical phase) in the instants comprised between t5 and t6 for the first cycle and between t15 and t16 for the second cycle, then there is a second current peak P2 (thermal phase) between the instants t6 and t7 for the first cycle and between t16 and t17 for the second cycle, then the ionization current I_ion has a substantially null value from the instant t7 for the first cycle and from the instant t17 for the second cycle.

Differently, in the third phase of the third cycle the ionization current I_ion is also substantially null between the instants t25 and t27, since there it occurred a misfire of the air-fuel mixture.

Furthermore in the third phase of measurement of the ionization current of the first and second cycle (instants comprised between t5 and t10 for the first cycle and between t15 and t20 for the second cycle), the integrating voltage V_int_I_ion instead has a decreasing monotonic trend starting from a substantially null value at the instant t5 for the first cycle and t15 for the second cycle, until reaching a maximum negative value Vint_max (equal for example to the Zener voltage V_DZ11 of the Zener diode DZ11): the detected value of the integrating voltage V_int_I_ion at a given instant of time in the third phase of measurement of the ionization current of the first and second cycle represents (without considering the sign) the underlying area from the ionization current I_ion up to the instant of time considered, i.e. the measurement of the integral of the ionization current I_ion.

In particular, the integrating voltage V_int_I_ion is the voltage drop V_C4 across the integrating capacitor C4 and thus during the third phase of measurement of the ionization current of the first and second cycle it is performed the charging of the integrating capacitor C4, which charge is limited to a negative value so that the voltage across the integrating capacitor C4 reaches a maximum negative value Vint_max equal to the Zener voltage V_DZ11 across the Zener diode DZ11 which is reversely biased.

For example, the Zener voltage V_DZ11 of the second Zener diode DZ11 is equal to 15 Volts, thus the value of the integrating voltage V_int_I_ion is limited to the value Vint_max=V_DZ11=−15 Volts, i.e. during the third phase of measurement of the ionization current of the first and second cycle the voltage across the integrating capacitor C4 is limited to a defined negative value equal for example to −15 Volts.

Otherwise, in the third phase of measurement of the ionization current of the third cycle (instants comprised between t25 and t30) the integrating voltage V_int_I_ion instead has a substantially null trend due to the misfire of the air-fuel mixture and thus the detected value of the integrating voltage V_int_I_ion at a given instant of time in the third phase of measurement of the ionization current of the third cycle is a very small value (i.e. approximately null), namely the measurement of the integral of the ionization current I_ion is a very small value (i.e. approximately null).

It will be described hereinafter the operation of the ignition system 15 according to the embodiment of the disclosure in three ignition cycles comprised between the instants t1 and t30 and a portion of a fourth ignition cycle subsequent to t30, referring also to FIGS. 1A-1C and 2A-C.

For the purposes of the explanation of the operation the following hypotheses are considered:

- the reference voltage V_ref is equal to the ground reference voltage;
- battery voltage V_batt=12 V;
- supply voltage VCC=5 V;
- the high-voltage switch 4 is implemented with an IGBT transistor;
- the bias circuit 6 is implemented with the parallel connection of the bias capacitor C6 and the Zener diode DZ8;
- the integrating circuit 7 is implemented with the parallel connection of the integrating capacitor C4 and the Zener diode DZ11,
- it is assumed that the integrating capacitor C4 at the initial instant t1 is charged, in particular the voltage across the integrating capacitor C4 is equal to the Zener voltage V_DZ11 of the Zener diode DZ11 (for example, −15 Volts);
- the control signal S_ctrl is a voltage signal;
- the ignition signal S_ac and the control signal S_ctrl have logical values in which the logical low value is 0 V and the logical high value is equal to the supply voltage VCC=5 V.
- the ratio between the turns of the coil 2 is N;
- in the case of a correct combustion of the air-fuel mixture, the length ΔT of the pulses of the combustion monitoring voltage S_id is directly proportional to the detected value of the integrating voltage V_int_I_ion.

It is assumed to start from a condition in which a proper ignition of the air-fuel mixture occurred in the ignition cycle prior to the instant t1.

At instant t1 the first ignition cycle starts and the Electronic Control Unit 20 generates the ignition signal S_ac having a transition from the logical low value to the logical high value (equal to the supply voltage VCC) which indicates the start of the phase of charging.

The driving unit 5 receives the ignition signal S_ac equal to the logical high value and generates, on the control terminal of the IGBT transistor 4, the control voltage signal S_ctrl having a value equal to the logical high value which closes the IGBT transistor 4 (see the configuration of FIG. 1A).

Furthermore at the instant t1 the local control unit 9 receives the detected value of the integrating voltage V_int_I_ion and generates the combustion monitoring voltage S_id having a voltage pulse I1 with a rising edge.

As the IGBT transistor 4 is closed, the first phase of charging energy begins in the primary winding 2-1 in which the primary current I_pr begins to flow from the battery voltage V_batt towards the ground reference voltage, crossing the primary winding 2-1 and the IGBT transistor 4.

The primary voltage V_pr has a transition from the value V_batt to the saturation voltage value Vds_sat, the voltage of the first terminal of the primary winding 2.1 remains equal to V_batt and thus the voltage drop across the primary winding 2-1 has a transition from the null value to the value equal to V_batt−Vds_sat; furthermore, the secondary voltage V_sec has a transition from the null value to the value N*(V_batt−Vds_sat).

The operation in the instants comprised between t1 and t2 (excluding t2) is similar to the operation described at instant t1, with the following differences.

In particular:

the control voltage signal S_ctrl maintains the value equal to the logical high value (equal to the supply voltage VCC), which maintains the IGBT transistor 4 closed;

the primary current I_pr which flows through the primary winding 2-1 has an increasing trend, which continues to charge the primary winding 2-1 with energy;

the voltage of the first terminal of the primary winding 2.1 remains equal to V_batt;

the primary voltage V_pr has an increasing trend as the primary current I_pr increases;

the voltage drop across the primary winding 2.1 has a decreasing trend;

the secondary voltage V_sec has a decreasing trend from the value N*V_batt to the value N*(V_batt−Vds_sat), with a trend that follows that of the primary voltage V_pr minus the value of the turns N ratio;

the integrating capacitor C4 is maintained charged at the value of the Zener voltage of the Zener diode DZ11 and thus the integrating voltage V_int_I_ion has a substantially constant trend equal to the value of the Zener voltage of the Zener diode DZ11 (for example, −15 Volts).

Moreove,r in the instants comprised between t1 and t2 the ionization current I_ion is null and the integrating voltage V_int_I_ion is also null.

Finally, in the instants comprised between t1 and t2 the local control unit 9 receives the detected value of the integrating voltage V_int_I_ion and generates, as a function of said detected value of the integrating voltage V_int_I_ion, the combustion monitoring voltage S_id having at the instant t1.1 a descending edge of the voltage pulse I1, thus generating a pulse I1 having a length ΔT1 directly proportional to the detected value of the integrating voltage V_int_I_ion in the ignition cycle (not shown in the figures) preceding the first cycle and in which it is assumed that a correct ignition of the air-fuel mixture has occurred: said length ΔT1 will be used by the Electronic Control Unit 20 to detect the presence or absence of a misfire of the air-fuel mixture in the combustion chamber of the cylinder of the engine in which the spark plug 3 is mounted.

At instant t2 the Electronic Control Unit 20 generates the ignition signal S_ac having a transition from the logical high value (equal to the supply voltage VCC) to the logical low value which indicates the end of the first phase of ignition and the start of the phase of transfer of energy from the primary winding 2-1 to the secondary winding 2-2.

The driving unit 5 receives the ignition signal S_ac equal to the logical low value and generates on the control terminal of the IGBT transistor 4 the control voltage signal S_ctrl having a logical low value which opens the IGBT transistor 4 (see the configuration of FIG. 1B).

Since the IGBT transistor 4 is open, the current flow I_chg from the battery voltage V_batt towards ground through the primary winding 2-1 is suddenly interrupted and thus the energy (previously stored in the primary winding 2-1) starts being transferred onto the secondary winding 2-2.

Consequently the primary voltage V_pr has a pulse of a high value (typically equal to 200-450 V) and short length (typically a few microseconds), the primary current I_pr suddenly decreases from the maximum value Ipr_max to null value, the secondary current I_sec has a pulse of value Isec_max and the secondary current V_sec has a pulse of a very high value (for example 30 KV), which triggers the spark across the electrodes of the spark plug 3.

Furthermore, at the instant t2 the charging of the bias capacitor C6 also begins by means of the pulse of the secondary current I_sec and the rapid and complete discharging of the integrating capacitor C4 begins: therefore in the second phase of transfer of energy the voltage across the integrating capacitor C4 first has a rapid transition towards a substantially null value and is then maintained equal to the substantially null value (for example, a positive value equal to approximately 0.7 Volts by means of the forward biasing of the Zener diode DZ11).

Note that for the sake of simplicity the primary current I_pr has been assumed to have an instantaneous transition from the maximum value Ipr_max to the null value at time instant t2, but in reality said transition occurs in a time interval which lasts for example between 2 and 15 microseconds: in this case the absolute value of the secondary voltage V_sec has an increasing trend with a high slope to the maximum value and the spark is emitted when the absolute value of the secondary voltage V_sec has reached the maximum value (and thus when the primary current I_pr has reached null value).

In the instants comprised between t2 and t5 (excluding t5) the spark between the electrodes of the spark plug 3 is maintained and thus the combustion of the air-fuel mixture continues.

The operation is similar to that described at the instant t2, thus the IGBT transistor 4 remains switched-off.

Consequently, the value of the primary current I_pr is maintained at zero, while the secondary current I_sec has a decreasing trend starting from the maximum value Isec_max.

In the instants comprised between t2 and t3 the secondary current I_sec flows through the secondary winding 2-2 and then through the bias capacitor C6 that is charged; in a certain instant the secondary current I_sec (which flows through the secondary winding 2-2) begins to flow through the Zener diode DZ8, which is then reversely biased and limits the voltage V_C6 across the bias capacitor C6 equal to the Zener voltage V_DZ8 of the first Zener diode DZ8 (for example, the Zener voltage V_DZ8 of the Zener diode DZ8 is equal to 200 V).

Moreover, in the instants following t2 the secondary current I_sec (which flows through the secondary winding 2-2 and then through the bias capacitor C6 or the Zener diode DZ8 as explained above) flows through the integrating capacitor C4 that rapidly discharges and thus the voltage across the integrating capacitor C4 has a rapid transition from the maximum negative value Vint_max towards a substantially null value.

Therefore while the bias capacitor C6 is charging (or while the bias capacitor C6 is already charged and is limited to the value of the Zener voltage V_DZ8 of the Zener diode DZ8), the integrating capacitor C4 rapidly discharges the residual charge that it had previously stored, so as to be ready to measure in the third phase the value of the integral of the ionization current I_ion.

In a certain instant following t2 the secondary current I_sec (which flows through the secondary winding 2-2 and then through the bias capacitor C6 or through the Zener diode DZ8 as explained above) begins to flow through the Zener diode DZ11 that is forwardly biased and thus at the instant t3 the voltage V_C4 across the integrating capacitor C4 (and thus the integrating voltage V_int_I_ion) is a positive value equal to approximately 0.7 Volts: since this value is very small with respect to the values of the Zener voltage V_DZ11 of the Zener diode DZ11, it was indicated above (and also indicated in FIG. 2A) that the integrating capacitor C4 in the second phase discharges down to reaching a "substantially null" value of the voltage V_C4 across itself.

Moreover, in the instants comprised between t2 and t5 the ionization current I_ion is null and the integrating voltage V_int_I_ion is also null.

At instant t5 it is possible to begin the measurement of the ionization current, as at the previous instant t4 the value of the secondary current I_sec has reached a null value and therefore it is possible to measure only the contribution of the current generated at the electrodes of the spark plug 3 following the ions generated during the combustion of the air-fuel mixture.

Therefore the third phase starts at the instant t5: the bias circuit 6 starts to generate a flow of the ionization current I_ion that flows through the secondary winding 2-2 and thus the integrating circuit 7 starts to measure the value of the integral of the intensity of the ionization current I_ion.

In particular, at the instant t5 the bias capacitor C6 operates as a generator of electrical energy (by means of the charge stored in the previous second phase) and starts the discharge of the bias capacitor C6 by means of the ionization current I_ion.

Moreover, at the instant t5 the charging of the integrating capacitor C4 starts towards a negative value, by means of the storage of electric charge generated by the ions generated in the combustion chamber after the end of the spark, and thus at the instant t5 the measurement of the value of the integral of the ionization current I_ion starts.

More in particular, in the instants comprised between t5 and t6 the first peak P1 of the value of the ionization current I_ion is generated (by means of the bias circuit 6), representative of the current generated by the ions produced during the chemical phase of the phase of measurement of the ionization current, and moreover the value proportional to the integral of the intensity of the ionization current I_ion is measured (by means of the integrating circuit 7, in particular by means of the integrating capacitor C4 that is charging), generating the integrating voltage signal V_int_I_ion.

Therefore in the instants comprised between t5 and t6 the charging of the integrating capacitor C4 continues and the integrating voltage V_int_I_ion has a decreasing trend from the null value at the instant t5 to a first negative value V1int at the instant t6 (for example, V1int=−2 Volts).

Similarly, in the instants comprised between t6 and t7 the second peak P2 of the value of the ionization current I_ion is generated (by means of the bias circuit 6), representative of the current generated by the ions produced during the thermal phase of the third phase of measurement of the ionization current, and the measurement (by means of the integrating circuit 7, in particular by means of the integrating capacitor C4) also continues of the value proportional to the integral of the intensity of the ionization current I_ion, generating the integrating voltage signal V_int_I_ion; therefore in the instants comprised between t6 and t7 the charging of the integrating capacitor C4 continues and the integrating voltage V_int_I_ion continues to have a decreasing trend from the first value V1int at the instant t6 to a maximum negative value Vint_max (greater in absolute value than V1int) at the instant t7 (for example, Vint_max=−15 Volts).

In the instants comprised between t7 and t10 the ionization current I_ion has a substantially null value since the activity on the electrodes of the spark plug 3 has ended, the integrating capacitor C4 maintains the charge and the integrating voltage V_int_I_ion has a constant trend equal to the maximum negative value Vint_max.

In the hypothesis in which the measured value of the integral of the ionization current reaches (in the instants comprised between t6 and t7 of the third phase) a high value, the reverse biasing of the Zener diode DZ11 occurs and thus the current flows from the ground reference terminal through the diode DZ11 (while the current across the integrating capacitor C4 becomes null), thus limiting the value of the voltage across the integrating capacitor C4 to a value equal to the Zener voltage V_DZ11 of the Zener diode DZ11 (for example equal to −15 Volts); therefore in an instant comprised between t6 and t7 the integrating voltage V_int_I_ion reaches a value equal to the Zener voltage V_DZ11 of the Zener diode DZ11 (for example, −15 Volts) and in the subsequent instants the integrating voltage V_int_I_ion has a substantially constant trend equal to the Zener voltage V_DZ11 of the Zener diode DZ11 (for example, −15 Volts).

It should be observed that in the known solutions that measure the ionization current, the bias capacitor C6 is maintained charged during the entire phase of measurement of the ionization current (i.e. it is necessary to maintain the voltage V_C6 across the bias capacitor C6 substantially constant at a value different from zero Volts).

Differently, according to the disclosure it is sufficient (by means of the charging of the integrating capacitor C4 and simultaneous discharging of the bias capacitor C6, and vice versa) to maintain (during the third phase of measurement of the ionization current) the bias capacitor C6 charged for a shorter time interval than the length of the third phase of measurement of the ionization current, thus allowing use of the bias capacitor C6 with much lower capacitance values (thus the bias capacitor C6 has smaller dimensions); for example, FIG. 2A shows that the voltage drop V_C6 across the bias capacitor C6 reaches a very small value (at the null limit) approximately at the time instant t7 in which the ionization current I_ion has reached the null value, but it is also possible that the voltage VC_6 reaches a very small value in a time instant before or after the time instant t7, in the latter case at a distance from the instant t7 which is much smaller than the distance from the instant t10.

For example, the value of the capacitance of the bias capacitor C6 has values comprised between 50 nF (nanofarad) and 150 nF.

At the instant t10 the first ignition cycle ends and the second ignition cycle begins, in which it is assumed that a correct combustion of the air-fuel mixture occurs again.

The operation between the instants t10 and t12 (first phase of charging energy) of the second ignition cycle is similar to that described above between the instants t1 and t2 of the first ignition cycle, with the difference that the integrating capacitor C4 begins to slowly discharge and is partially discharged through the charge seen from the terminal 04 of the integrating capacitor C4.

Moreover, at the instant t10 the control signal S_ctrl has a rising edge and the local control unit 9 generates the combustion monitoring voltage S_id carrying a voltage pulse 12 having a rising edge, which will be used by the Electronic Control Unit 20 to detect the presence in the first cycle of the correct combustion of the air-fuel mixture in the combustion chamber of the cylinder of the engine in which the spark plug 3 is mounted.

In particular, the local control unit 9 receives the integrating voltage V_int_I_ion representative of a value directly proportional to the measurement of the integral of the ionization current I_ion in the first ignition cycle and generates the combustion monitoring voltage S_id carrying the voltage pulse I2 having a length ΔT2 directly proportional to the value of the integrating voltage V_int_I_ion of the phase of measurement of the ionization current I_ion of the first ignition cycle.

Therefore in the instants comprised between t10 and t12, the local control unit 9 transmits to the Electronic Control Unit 20 the combustion monitoring voltage S_id carrying the voltage pulse I2 having a length ΔT2; the Electronic Control Unit 20 receives the combustion monitoring voltage S_id, performs the comparison between the value of the temporal length ΔT2 and the value of the ignition threshold, detects that the value of the temporal length ΔT2 is greater than the value of the ignition threshold and thus detects that in the first ignition cycle a misfire of the air-fuel mixture has not occurred in the combustion chamber of the cylinder of the engine in which the spark plug 3 is mounted (i.e. in the first cycle a correct spark occurred between the electrodes of the spark plug 3, i.e. a correct combustion of the air-fuel mixture occurred).

The operation between the instants t12 and t15 (second phase of transfer of energy in which the spark occurs) of the second ignition cycle is equal to that described previously between the instants t2 and t5 of the first ignition cycle.

In particular, between the instants t12 and t13 of the second cycle (t13 near t12) the rapid discharge of the residual voltage across the integrating capacitor C4 occurs (which was charged in the previous phase of measurement of the ionization current of the first cycle) by means of the flow of the secondary current I_sec, until reaching at the instant t13 a substantially null value (for example, approximately 0.7 Volts) of the voltage across the integrating capacitor C4 by means of the forward biasing of the Zener diode DZ11: in this way the integrating capacitor C4 (completely discharged) is ready to be used to store the charge generated in the phase of measurement of the ionization current of the second cycle, therefore the integrating circuit 7 is automatically reset, without requiring the intervention of the driving unit 5 or the Electronic Control Unit 20.

It should be noted that the discharge of the residual voltage across the integrating capacitor C4 during the first phase of the second cycle occurs much more slowly than that during the second phase of the second cycle.

Therefore during the phases of charging and transfer of energy of the second cycle (instants comprised between t10 and t15), the integrating voltage V_int_I_ion has an increasing trend from the maximum negative value Vint_max to a substantially null value (for example, approximately 0.7 Volts) at the instant t13 and then is maintained equal to the substantially null value (see FIG. 2B), wherein said substantially null value is reached at an instant t13 not very far from the instant t12.

The operation between the instants t15 and t20 (third phase of measurement of the ionization current) of the second ignition cycle is similar to that described above between the instants t5 and t10 of the first ignition cycle, therefore the bias capacitor C6 is discharged at least partially by means of the flow of the ionization current I_ion through the secondary winding 2-2 and the integrating capacitor C4 is charged towards a negative value, thus measuring a value proportional to the integral of the ionization current I_ion by means of the detection of the integrating voltage signal V_int_I_ion across the integrating capacitor C4.

In the instants comprised between t17 and t20 the ionization current I_ion has a substantially null value, as the activity of the spark plug 3 on the electrodes has finished.

At the instant t20 the second ignition cycle ends and the third ignition cycle begins, in which a misfire occurs.

The operation between the instants t20 and t22 (first phase of charging energy) of the third ignition cycle is similar to that described previously between the instants t10 and t12 of the second ignition cycle.

In particular, at the instant t20 the control signal S_ctrl has a rising edge and the local control unit 9 generates the combustion monitoring voltage S_id carrying a voltage pulse 13 having a rising edge, which will be used by the Electronic Control Unit 20 to detect the presence in the second cycle of the correct combustion of the air-fuel mixture in the combustion chamber of the cylinder of the engine in which the spark plug 3 is mounted.

In particular, the local control unit 9 receives the integrating voltage V_int_I_ion representative of a value directly proportional to the measurement of the integral of the ionization current I_ion in the second ignition cycle and generates the combustion monitoring voltage S_id carrying the voltage pulse I3 having a length ΔT3 directly proportional to the value of the integrating voltage V_int_I_ion of the phase of measurement of the ionization current I_ion of the second ignition cycle.

Therefore in the instants comprised between t20 and t22, the local control unit 9 transmits to the Electronic Control Unit 20 the combustion monitoring voltage S_id carrying the voltage pulse I3 having a length ΔT3, the Electronic Control Unit 20 receives the combustion monitoring voltage S_id, performs the comparison between the value of the temporal length ΔT3 and the ignition threshold, detects that the value of the temporal length ΔT3 is greater than the value of the ignition threshold and thus detects that in the second ignition cycle a misfire of the air-fuel mixture has not occurred in the combustion chamber of the cylinder of the engine in which the spark plug 3 is mounted (i.e. in the second cycle a correct spark occurred between the electrodes of the spark plug 3, i.e. a correct combustion of the air-fuel mixture occurred).

The operation between the instants t22 and t25 (second phase of transfer of energy) of the third ignition cycle is similar to that described previously between the instants t12 and t15 of the second ignition cycle.

Differently, the operation between the instants t25 and t30 (third phase of measurement of the ionization current and measurement of the integral of the ionization current) of the third ignition cycle is different from that between the instants t15 and t20 of the second ignition cycle, as in the third cycle a misfire of the air-fuel mixture has occurred in the combustion chamber of the cylinder of the engine in which the spark plug 3 is mounted.

In particular, in the instants comprised between t25 and t30 of the third cycle the value of the ionization current I_ion that flows through the secondary winding 2-2 is substantially null due to a misfire of the air-fuel mixture and thus the integrating capacitor C4 does not charge, but is maintained discharged at a substantially null value; consequently, during the third phase of the third cycle the integrating voltage V_int_I_ion having substantially null values is detected, i.e. the measured value of the integral of the ionization current I_ion in the third phase of the third cycle is approximately equal to zero.

At the instant t30 the third ignition cycle ends and the fourth ignition cycle begins, which is only partially shown in FIG. 2C.

In particular, FIG. 2C shows that at the instant t30 the control signal S_ctrl has a rising edge and the local control unit 9 generates the combustion monitoring voltage S_id carrying a voltage pulse I4 having a rising edge, which will be used by the Electronic Control Unit 20 to detect the presence in the third cycle of the misfire of the air-fuel mixture in the combustion chamber of the cylinder of the engine in which the spark plug 3 is mounted.

In particular, the local control unit 9 receives the integrating voltage V_int_I_ion having an approximately null value since in the third ignition cycle the measurement of the integral of the ionization current I_ion is approximately equal to zero due to the misfire, thus the local control unit 9 generates the combustion monitoring voltage S_id carrying the voltage pulse I4 having a very small length ΔT4.

Therefore in the instants comprised between t30 and t30.1, the local control unit 9 transmits to the Electronic Control Unit 20 the combustion monitoring voltage S_id carrying the voltage pulse I4 having a very small length ΔT4; the Electronic Control Unit 20 receives the combustion monitoring voltage S_id, performs the comparison between the value of the temporal length ΔT4 and the ignition threshold, detects that the value of the temporal length ΔT4 is smaller than the value of the ignition threshold and thus detects that in the third ignition cycle a misfire of the air-fuel mixture has occurred in the combustion chamber of the cylinder of the engine in which the spark plug 3 is mounted (i.e. in the third cycle a correct spark has not occurred between the electrodes of the spark plug 3, i.e. a correct combustion of the air-fuel mixture has not occurred).

It should be observed that for the purposes of the previous explanation of the operation of the disclosure it has been considered for simplicity that in the case of a correct combustion of the air-fuel mixture, the length ΔT of the pulses of the combustion monitoring voltage S_id is directly proportional to the (absolute) value detected of the integrating voltage V_int_I_ion, but more in general the disclosure is applicable to the case in which the length ΔT of the pulses of the combustion monitoring voltage S_id is increasing with the increase of the (absolute) value detected of the integrating voltage V_int_I_ion.

It should also be observed that the driving unit 5 and the local control unit 9 can also be implemented with a single electronic component that performs both the function of driving the driving unit 5, and the control function of the local control unit 9; in other words, the local control unit 9 can be incorporated within the driving unit 5, or vice versa.

It should be observed that FIGS. 2A-2C show the case in which the combustion monitoring voltage S_id carries temporal pulses I1, I2, I3, I4 representative of the presence or absence of a misfire in the previous cycle, i.e.:

- the temporal length ΔT1 of the first voltage pulse I1 is positioned inside the first phase of charging of the first cycle, but it is representative of the absence of a misfire in the cycle (not shown in FIGS. 2A-2C) prior to the first cycle comprised between t1 and t10,
- the temporal length ΔT2 of the second voltage pulse I2 is positioned inside the first phase of charging of the second cycle, but it is representative of the absence of a misfire of the first cycle comprised between t1 and t10,
- the temporal length ΔT3 of the third voltage pulse I3 is positioned inside the first phase of charging of the third cycle, but it is representative of the absence of a misfire of the second cycle comprised between t10 and t20;
- the temporal length ΔT4 of the fourth voltage pulse I4 is positioned inside the first phase of charging of the fourth cycle, but it is representative of the presence of a misfire in the third cycle comprised between t20 and t30.

Alternatively, it is also possible to generate the combustion monitoring voltage S_id so that it carries temporal pulses I1, I2, I3 representative of the presence or absence of a misfire in the same cycle, i.e.:

- the temporal length ΔT1 of the first voltage pulse I1 is positioned inside the first phase of charging of the first cycle, and it is representative of the absence of a misfire of the first cycle comprised between t1 and t10;
- the temporal length ΔT2 of the second voltage pulse I2 is positioned inside the first phase of charging of the second cycle, and it is representative of the absence of a misfire of the second cycle comprised between t10 and t20;
- the temporal length ΔT3 of the third voltage pulse I3 is positioned inside the first phase of charging of the third cycle, and it is representative of the presence of a misfire in the third cycle comprised between t20 and t30.

Figure 3:
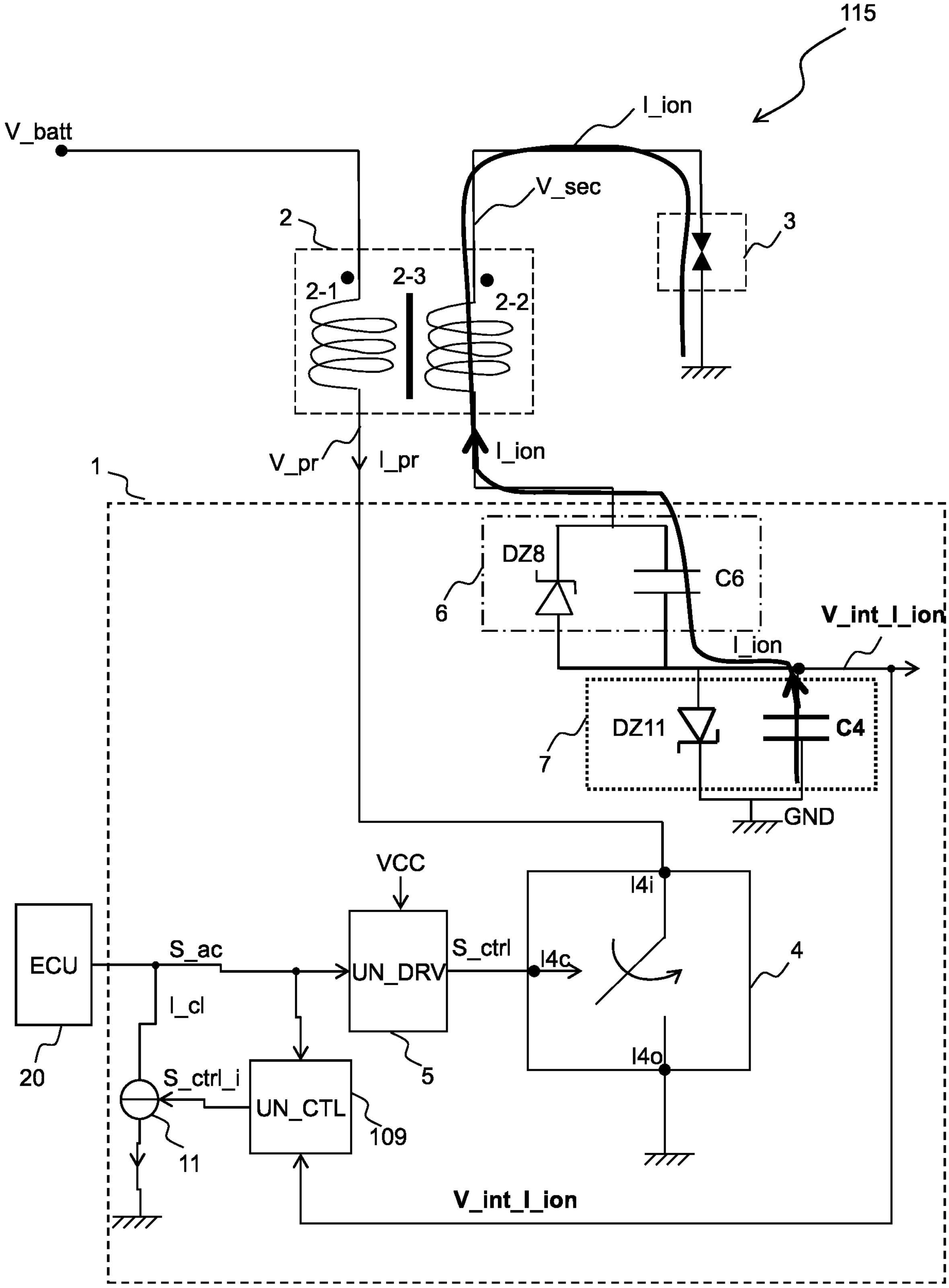
FIG. 3 shows the block diagrams of the electronic ignition system according to a variant of the embodiment of the disclosure.

With reference to FIG. 3, it shows an electronic ignition system 115 according to a variant of the embodiment of the disclosure.

The ignition system 115 of FIG. 3 differs from that of FIGS. 1A-C in that it further comprises a current generator 11 controlled as a function of the value of a current control signal S_ctrl_i generated by the local control unit 109 (similar to 9): in this way it is possible to avoid the use of an additional connection between the local control unit 109 and the Electronic Control Unit 20 for transferring the combustion monitoring signal S_id.

In particular, the current generator 11 is configured to generate a trigger current I_cl having a value that depends on the value of the current control signal S_ctrl_i, which in turn depends on the detected value of the integrating voltage V_int_I_ion.

Figure 4A:
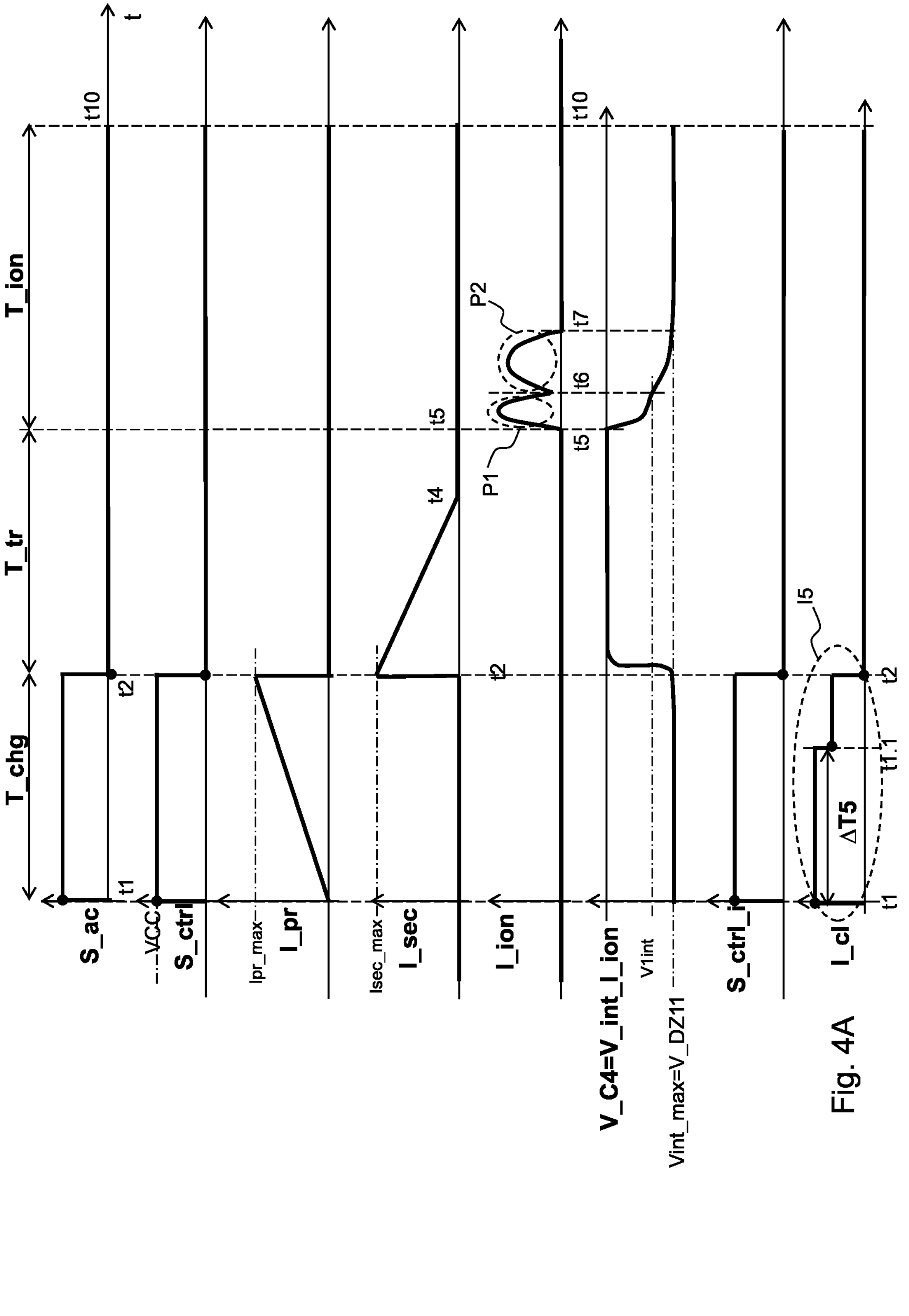
FIGS. 4A-4C schematically show a possible trend of some signals generated in the electronic ignition system according to the variant of the embodiment of the disclosure.
Figure 4B:
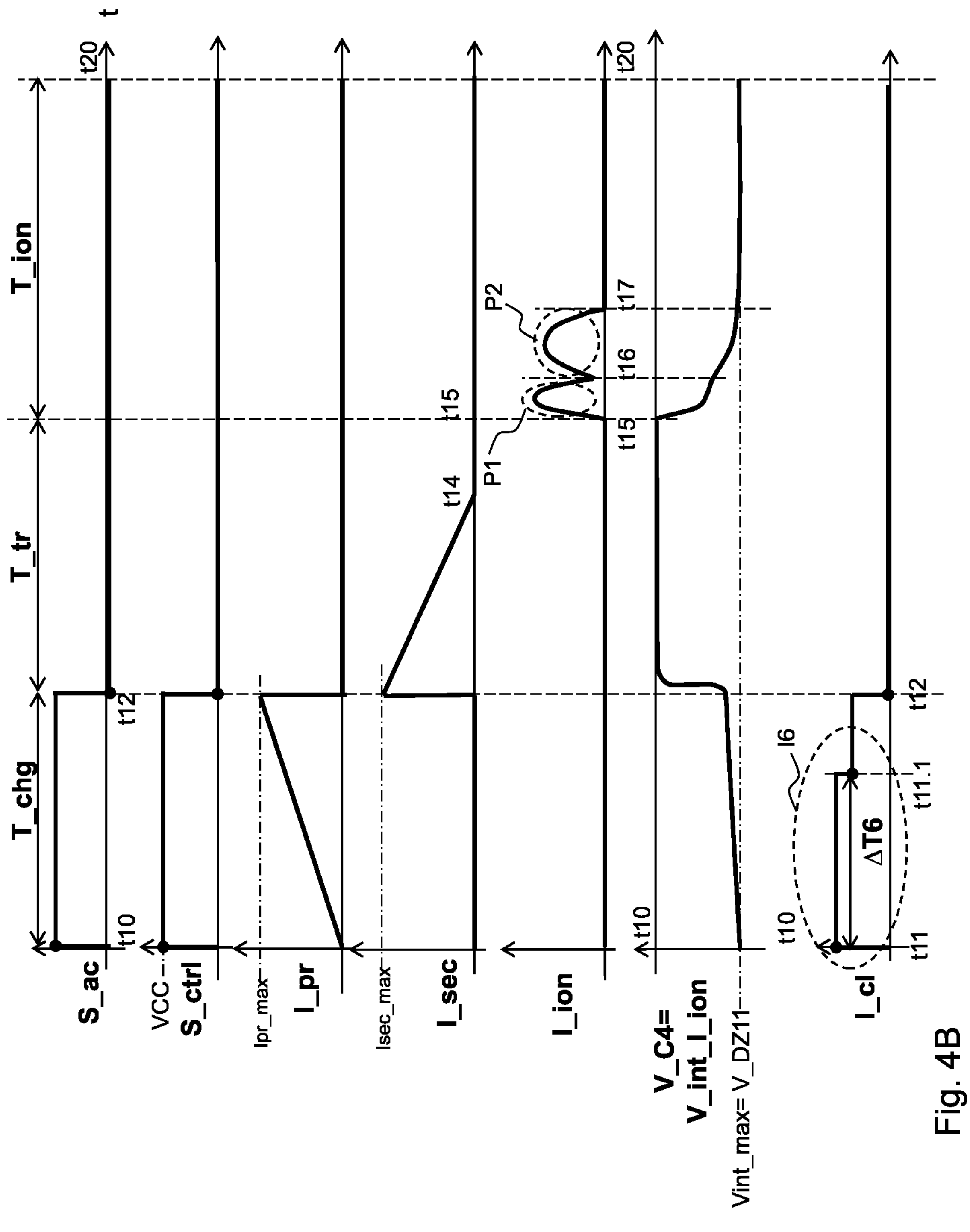
Figure 4C:
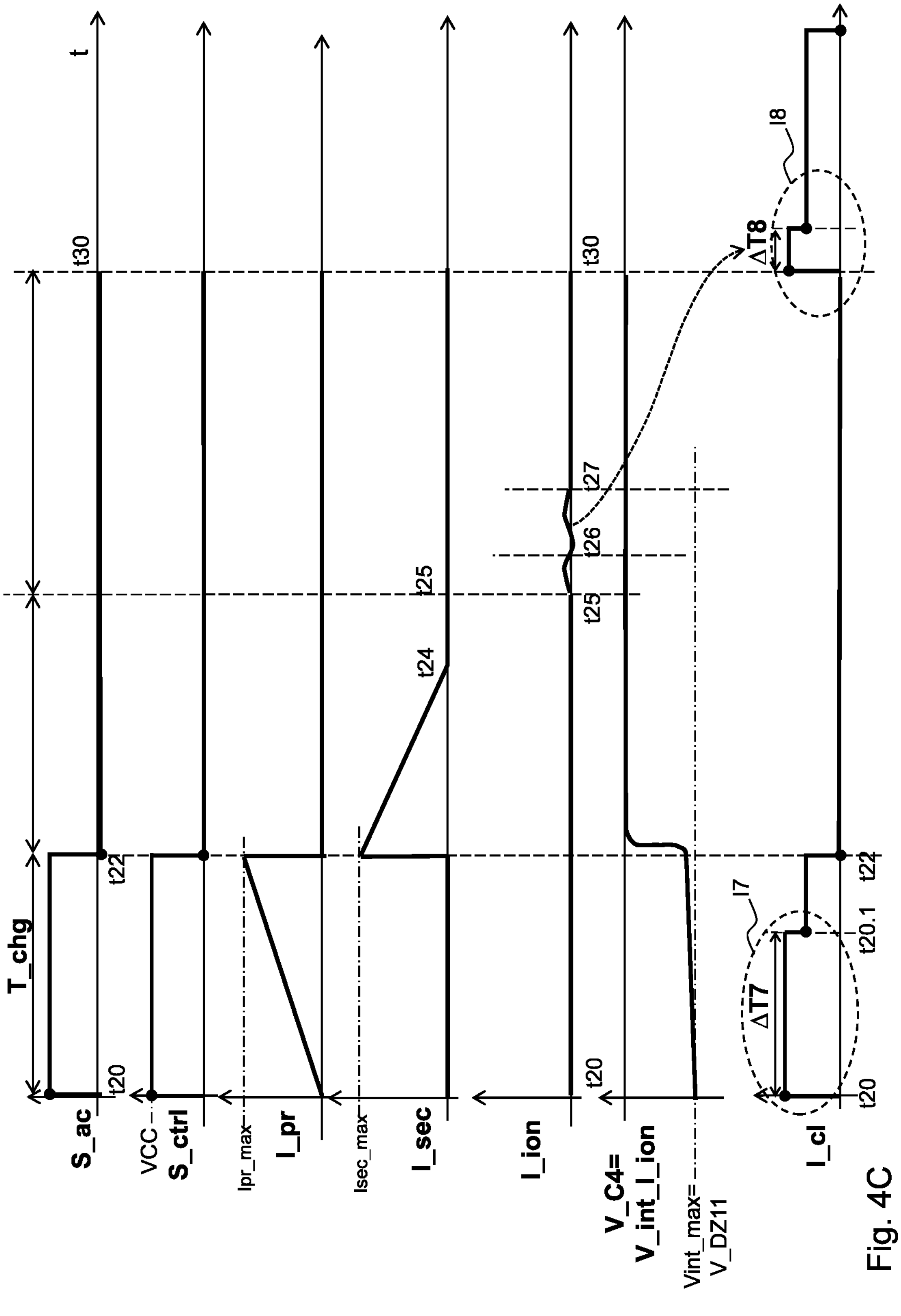

More in particular, in the variant of the disclosure the distance between two edges of the variation of a pulse of the trigger current I_cl is used (see the pulses I5, I6, I7, I8 and respective distances ΔT5, ΔT6, ΔT7, ΔT8 in FIGS. 4A-C) to determine in each combustion cycle the presence or absence of a misfire in the previous cycle, i.e. the distance between the two edges of the current pulse is directly proportional to the value of the integrating voltage signal V_int_I_ion during the phase of measurement of the ionization current of the previous cycle.

The local control unit 9 comprises a first input terminal adapted to receive the ignition signal Sac, comprises a second input terminal adapted to receive the integrating voltage signal V_int_I_ion representative of the measured value of the integral of the ionization current I_ion (measured by means of the voltage drop across the integrating capacitor C4 of the integrating circuit 7) and comprises an output terminal adapted to generate, as a function of the value of the ignition signal Sac and the detected value of the integrating voltage V_int_I_ion, the current control signal S_ctrl_i to control the value of the trigger current I_cl generated by the current generator 11.

With reference to FIGS. 4A-4C, the trend of some signals of the electronic ignition system 115 of FIG. 3 is shown.

The case is considered in which the distance between the two edges of the variation of the trigger current I_cl of a cycle is representative of the presence or absence of a misfire of a previous cycle.

In particular, it is assumed that in the first cycle comprised between t1 and t10 a correct combustion of the air-fuel mixture occurs, that in the second cycle comprised between t10 and t20 a correct combustion occurs and that in the third cycle comprised between t20 and T30 a misfire occurs.

It can be observed that the value of the distances ΔT6 and ΔT7 between two variation edges of the trigger current I_cl in the second and third ignition cycle are much greater than the distance ΔT8 between two variation edges of the trigger current I_cl in the fourth cycle, as in the first and second cycle a proper ignition of the air-fuel mixture occurred, while in the third cycle a misfire of the air-fuel mixture occurred.

It should be observed that for the purposes of explanation of the disclosure the case was considered of a misfire of the comburent-combustible mixture (for example, air-fuel) in the combustion chamber of the cylinder in which the spark plug 3 is mounted, but more in general the disclosure is applicable to the case in which a combustion of the comburent-combustible mixture of an insufficient entity occurs in the combustion chamber (i.e. an insufficient spark occurs between the electrodes of the spark plug 3); therefore the previous considerations concerning misfire are applicable in a similar way to the case of an insufficient combustion.

Figure 5:
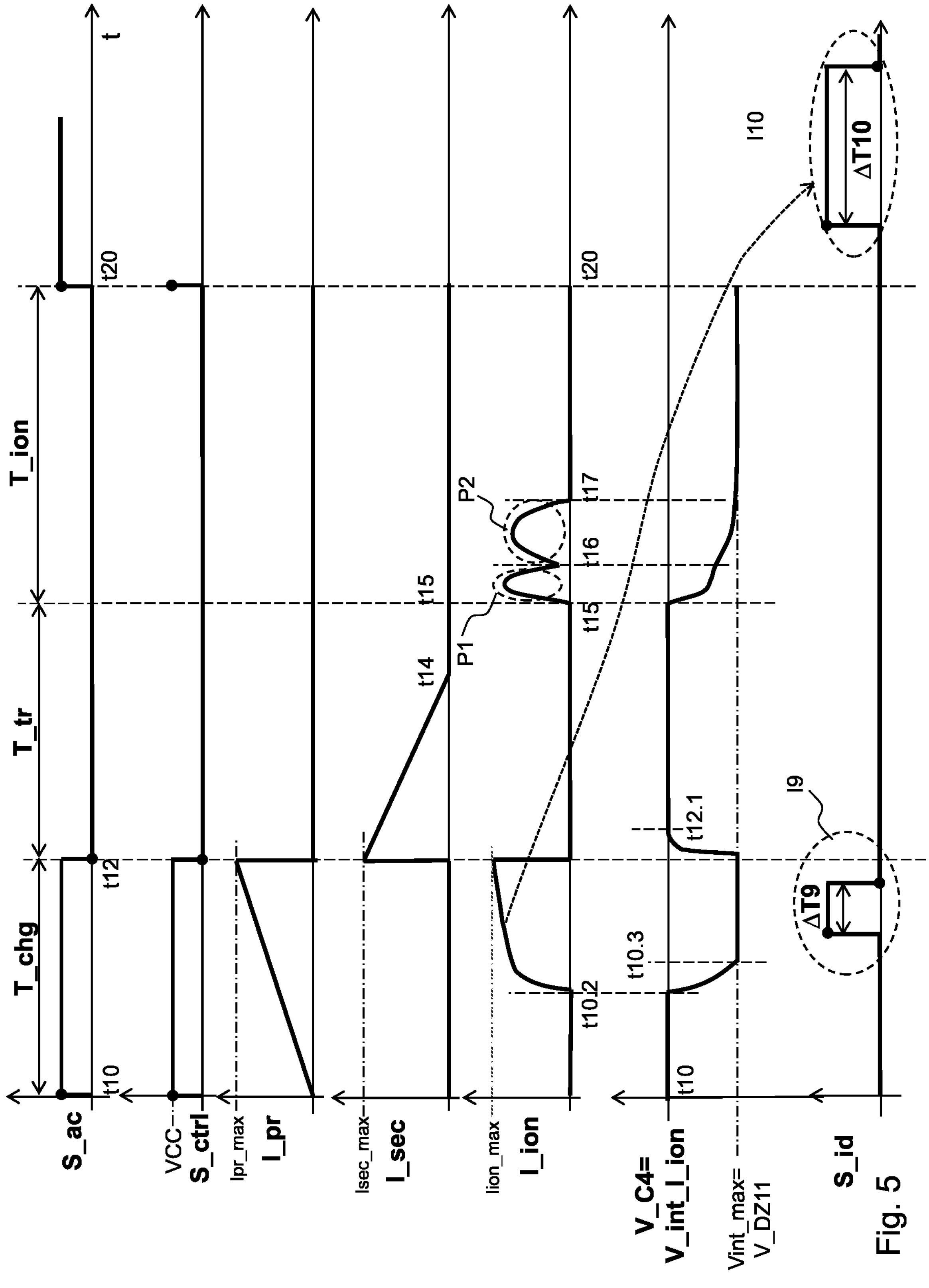
FIG. 5 schematically shows a possible trend of some signals generated in the electronic ignition system according to the disclosure, in the case in which a pre-ignition of the comburent-combustible mixture occurs.

With reference to FIG. 5, it shows the trend of the signals in the ignition system in case of a pre-ignition of the air-fuel mixture during the first phase of charging energy in the primary winding 2-1: in this case an ionization current I_ion is generated through the secondary winding 2-2 also during the first phase of charging energy in the primary winding 2-1.

FIG. 5 shows an ignition cycle similar to that of FIG. 2B, with the difference that the ionization current I_ion has an increasing trend from the null value to a maximum value Iion_max between the instants t10.2 and t12 of the first phase of charging energy in the primary winding 2-1 since a pre-ignition of the air-fuel mixture occurred starting from the instant t10.2, accordingly, during the first phase of charging a pre-charge of the integrating capacitor C4 occurs, thus the integrating signal V_int_I_ion (i.e. the value of the integral of the ionization current I_ion) is null between the instants t10 and t10.2, then at the instant t10.2 it starts to have a decreasing monotonic trend until reaching the maximum negative value Vint_max (equal for example to the Zener voltage V_DZ11 of the Zener diode DZ11) in an instant t10.3 comprised between the instants t10.2 and t12.

Subsequently, in the second phase of transfer of energy the integrating signal V_int_I_ion has a trend increasing rapidly towards the null value due to the rapid discharge of the integrating capacitor C4, thus the integrating signal V_int_I_ion maintains the value substantially null (for example, equal to 0.7 Volts) during the remaining time interval of the second phase of transfer of energy comprised between t12.1 and t15.

Finally in the third phase of measurement of the ionization current (instants comprised between t15 and t20) the trend of the integrating signal V_int_I_ion is similar to that previously described for the second cycle of the embodiment of the disclosure of FIG. 2B, i.e. starting from the instant t15 it has a decreasing trend from the null value until reaching the maximum negative value Vint_max at the instant t17 due to the charging of the integrating capacitor C4, thus the integrating signal V_int_I_ion has a substantially constant trend equal to Vint_max in the remaining time interval of the third phase comprised between t17 and t20.

In the case in which a pre-ignition of the air-fuel mixture does not occur in the combustion chamber during the phase of charging, the integrating capacitor C4 maintains the charge state substantially constant, i.e. a substantially null value (as shown in FIG. 5) or a value equal to the Zener voltage V_DZ11 of the diode DZ11 (as shown in FIG. 2A).

The previous considerations relating to the voltage pulses of FIGS. 2A-2C and the current pulses of FIGS. 4A-4C for misfire are applicable in a similar way to pre-ignition, with the difference that the voltage or current pulses are positioned at the end of the first phase of charging energy.

Therefore the voltage pulse (see I9 and I10 in FIG. 5) carried from the monitoring signal S_id is positioned in the final part of the ignition signal S_ac in which it has a high value and is related to the presence or absence of a pre-ignition in the previous cycle, and has an opposite meaning with respect to that of the detection of a misfire, i.e.:

- if the length ΔT is less than the value of a pre-ignition threshold, it means that a pre-ignition did not occur in the previous cycle,
- if the length ΔT is greater than or equal to the value of the pre-ignition threshold, it means that a pre-ignition occurred in the previous cycle.

Considering the example shown in FIG. 5, the voltage pulse I9 in the second cycle has a length ΔT9 less than the value of the pre-ignition threshold because a pre-ignition did not occur in the first cycle, while the voltage pulse I10 in the third cycle has a length ΔT9 greater than the value of the pre-ignition threshold because a pre-ignition occurred in the second cycle.

The invention claimed is:

1. An electronic ignition system to detect a misfire in an internal combustion engine, the system comprising:

a coil having a primary winding with a first terminal connected to a battery voltage and having a secondary winding with a first terminal connected to a spark plug;

an electronic control device comprising:

a high-voltage switch connected in series to a primary winding of a coil and configured to switch between a closed position and an open position;

a driving unit configured to:

control a closure of the high-voltage switch during a phase of charging energy into the primary winding;

control the opening of the high-voltage switch during a phase of transfer of energy from the primary winding to a secondary winding of the coil and during a phase of measurement of an ionization current subsequent to the phase of transfer of energy, wherein said ionization current is generated by ions produced during a process of combustion of a comburent-combustible mixture in a combustion chamber of a cylinder of the engine by means of a spark generated by a spark plug in the phase of transfer of energy;

a bias circuit configured to generate said ionization current during the phase of measurement of the ionization current, wherein said bias circuit is connected in series to a second terminal of the secondary winding;

an integrating circuit interposed between the bias circuit and a reference voltage;

wherein said integrating circuit is configured to:

completely discharge towards a substantially null value by means of the current flowing through the secondary winding during the phase of transfer of energy from the primary winding to the secondary winding;

charge, by means of the ionization current generated by the bias circuit, to a value different from zero during the phase of measurement of the ionization current so as to measure a value of the integral of the ionization current, in a case of a correct ignition of the comburent-combustible mixture;

maintain a substantially null charge during the phase of measurement of the ionization current so as to measure a substantially null value of the integral of the ionization current, in the case of a misfire of the comburent-combustible mixture;

wherein the primary winding has a second terminal connected to the high-voltage switch;

an electronic control unit connected to the driving unit of the electronic control device and comprising an output terminal adapted to generate an ignition signal having a first value indicating a start of the phase of charging the primary winding and having a second value indicating the start of the phase of transfer of energy from the primary winding to the secondary winding, and wherein the driving unit is further configured to receive the ignition signal and generate, as a function thereof, a control signal for opening and closing the high-voltage switch, wherein the electronic device further comprises a local control unit connected to the integrating circuit and to the electronic control unit, wherein the local control unit comprises:

a first input terminal adapted to receive the ignition signal;

a second input terminal adapted to receive an integrating voltage signal representative of the voltage across the integrating circuit;

an output terminal adapted to generate a combustion monitoring signal carrying, during the phase of charging energy, a voltage pulse having a length increasing with the increase of the value of the integrating voltage signal in the phase of measurement of the ionization current of a previous cycle;

wherein the electronic control unit further comprises an input terminal adapted to receive the combustion monitoring signal, and wherein the electronic control unit is configured to detect a presence or an absence of a misfire as a function of a comparison between the length of said voltage pulse and an ignition threshold.

2. The electronic ignition system according to claim 1, wherein the value of the ignition threshold is variable and depends at least on a number of engine revolutions and on an engine load.

3. The electronic ignition system according to claim 1, wherein the bias circuit and the integrating circuit are enclosed in a single casing.

4. The electronic system according to claim 3, wherein said casing further comprises the high-voltage switch and the driving unit.

5. The electronic system according to claim 4, wherein the electronic control unit, the high-voltage switch and the driving unit are enclosed in a further casing.

6. The electronic ignition system according to claim 1, wherein the integrating circuit comprises an integrating capacitor connected in series to the bias circuit and connected between the bias circuit and the reference voltage, wherein the integrating circuit comprises the connection in parallel of the integrating capacitor and of a Zener diode, the Zener diode having an anode terminal connected to the bias circuit and having a cathode terminal connected towards the reference voltage, wherein during the phase of measurement of the ionization current the Zener diode is reversely biased and it is configured to limit the voltage across the integrating capacitor during its charging to a maximum defined value equal to the Zener voltage of the Zener diode, and wherein during the phase of transfer of energy the Zener diode is forwardly biased and it is configured to bias the voltage across the integrating capacitor to a substantially null value.

7. The electronic ignition system according to claim 1, wherein the bias circuit comprises a connection in parallel of a bias capacitor and of a further Zener diode, the further Zener diode having an anode terminal connected to the integrating circuit and having a cathode terminal connected to the second terminal of the secondary winding, wherein the bias capacitor is configured to:

charge during the phase of transfer of energy, by means of the current flowing through the secondary winding generated by the spark of the spark plug;

discharge at least partially by means of the ionization current during the phase of measurement of the ionization current;

wherein during the phase of transfer of energy the further Zener diode is reversely biased and it is configured to limit the voltage across the bias capacitor during its charging to a maximum defined value equal to the Zener voltage of the further Zener diode.

8. The electronic ignition system according to claim 6, wherein said integrating capacitor is further configured to:

in case wherein a pre-ignition of the comburent-combustible mixture in the combustion chamber during the phase of charging occurs, pre-charge during the phase of charging energy into the primary winding by means of the ionization current flowing through the secondary winding during the phase of charging, so as to measure a value of the integral of the ionization current which flows through the secondary winding during the phase of charging due to said pre-ignition;

in case wherein the pre-ignition of the comburent-combustible mixture does not occur, maintain a charge state substantially constant during the phase of charging energy.

9. An electronic ignition system to detect a misfire in an internal combustion engine, the system comprising:

a coil having a primary winding with a first terminal connected to a battery voltage and having a secondary winding with a first terminal connected to a spark plug;

an electronic control device comprising:

a high-voltage switch connected in series to a primary winding of a coil and configured to switch between a closed position and an open position;

a driving unit configured to:

control a closure of the high-voltage switch during a phase of charging energy into the primary winding;

control the opening of the high-voltage switch during a phase of transfer of energy from the primary winding to a secondary winding of the coil and during a phase of measurement of an ionization current subsequent to the phase of transfer of energy, wherein said ionization current is generated by ions produced during a process of combustion of a comburent-combustible mixture in a combustion chamber of a cylinder of the engine by means of the spark generated by a spark plug in the phase of transfer of energy;

a bias circuit configured to generate said ionization current during the phase of measurement of the ionization current, wherein said bias circuit is connected in series to a second terminal of the secondary winding;

an integrating circuit interposed between the bias circuit and a reference voltage;

wherein said integrating circuit is configured to:

completely discharge towards a substantially null value by means of the current flowing through the secondary winding during the phase of transfer of energy from the primary winding to the secondary winding;

charge, by means of the ionization current generated by the bias circuit, to a value different from zero during the phase of measurement of the ionization current so as to measure a value of the integral of the ionization current, in a case of a correct ignition of the comburent-combustible mixture;

maintain a substantially null charge during the phase of measurement of the ionization current so as to measure a substantially null value of the integral of the ionization current, in the case of a misfire of the comburent-combustible mixture;

wherein the primary winding has a second terminal connected to the high-voltage switch;

an electronic control unit connected to the driving unit of the electronic control device and comprising an output terminal adapted to generate an ignition signal having a first value indicating a start of the phase of charging the primary winding and having a second value indicating the start of the phase of transfer of energy from the primary winding to the secondary winding, and wherein the driving unit is further configured to receive the ignition signal and generate, as a function thereof, a control signal for opening and closing the high-voltage switch, wherein the electronic device further comprises:

a local control unit connected to the integrating circuit and to the electronic control unit, a current generator adapted to generate a trigger current controlled by the local control unit;

wherein the local control unit comprises:

a first input terminal adapted to receive the ignition signal;

a second input terminal adapted to receive an integrating voltage signal representative of the voltage across the integrating circuit;

an output terminal adapted to generate a control signal of the current of said current generator;

wherein the current generator is configured to generate, during the phase of charging energy, a current pulse having two variation edges that define a distance increasing with the increase of the value of the integrating voltage signal in the phase of measurement of the ionization current of a previous cycle, and wherein the electronic control unit is configured to detect a presence or an absence of a misfire as a function of a comparison between the distance of said current pulse and an ignition threshold.

10. The electronic ignition system according to claim 9, wherein the value of the ignition threshold is variable and depends at least on a number of engine revolutions and on an engine load.

11. The electronic ignition system according to claim 9, wherein said integrating circuit comprises an integrating capacitor connected in series to the bias circuit and connected between the bias circuit and the reference voltage, wherein said integrating capacitor is configured to:

completely discharge towards a substantially null value by means of the current flowing through the secondary winding during the phase of transfer of energy from the primary winding to the secondary winding;

charge, by means of the ionization current generated by the bias circuit, to a value different from zero during the phase of measurement of the ionization current so as to measure a value of the integral of the ionization current, in the case of the correct ignition of the comburent-combustible mixture;

maintain a substantially null charge during the phase of measurement of the ionization current so as to measure a substantially null value of the integral of the ionization current, in the case of a misfire of the comburent-combustible mixture.

* * * * *